(12) United States Patent
Park et al.

(10) Patent No.: US 9,478,804 B2
(45) Date of Patent: Oct. 25, 2016

(54) CATHODE ACTIVE MATERIAL, CATHODE INCLUDING THE CATHODE ACTIVE MATERIAL, AND SODIUM SECONDARY BATTERY INCLUDING THE CATHODE

(71) Applicant: Samsung Electronics Co., Ltd., Suwon-si, Gyeonggi-do (KR)

(72) Inventors: Kwang-jin Park, Seongnam-si (KR); Dong-wook Han, Yongin-si (KR); Hyun-jin Kim, Hwaseong-si (KR); Seok-soo Lee, Yongin-si (KR); Won-seok Chang, Namyangju-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 43 days.

(21) Appl. No.: 14/519,213

(22) Filed: Oct. 21, 2014

(65) Prior Publication Data

US 2015/0111097 A1   Apr. 23, 2015

(30) Foreign Application Priority Data

Oct. 21, 2013  (KR) .................. 10-2013-0125546

(51) Int. Cl.
*H01M 4/485*  (2010.01)
*C01D 1/02*  (2006.01)
(Continued)

(52) U.S. Cl.
CPC .......... *H01M 4/485* (2013.01); *C01G 45/1228* (2013.01); *C01G 49/009* (2013.01); *C01G 49/0018* (2013.01); *C01G 51/50* (2013.01); *C01G 53/50* (2013.01); *H01M 4/366* (2013.01); *H01M 4/505* (2013.01); *H01M 4/525* (2013.01);
(Continued)

(58) Field of Classification Search
CPC .......... C01G 45/1228; C01G 49/0018; C01G 49/009; C01G 51/50; C01G 53/50; C01P 2002/54; C01P 2004/03; C01P 2006/40; H01M 10/054; H01M 4/366; H01M 4/485; H01M 4/505; H01M 4/525; H01M 4/625
See application file for complete search history.

(56) References Cited

U.S. PATENT DOCUMENTS 7,521,152 B2   4/2009   Takeda et al.
7,759,008 B2   7/2010   Barker et al.
(Continued)

FOREIGN PATENT DOCUMENTS

JP   2012182087 A   9/2012
JP   2012201588 A   10/2012

OTHER PUBLICATIONS

K. Park, D. Han, H. Kim, W.-S. Chang, B. Choi, B. Anass, S. Lee. Characterization of a P2-type chelating-agentassisted Na2/3Fe1/2Mn1/2O2 cathode material for sodium-ion batteries, RSC Adv., 2014, 4, 22798.*

(Continued)

*Primary Examiner* — Carlos Barcena
(74) *Attorney, Agent, or Firm* — Cantor Colburn LLP

(57) ABSTRACT

A cathode active material including a composite transition metal oxide including: sodium; a first transition metal; and a second transition metal, wherein the composite transition metal oxide has a first diffraction peak corresponding to a Miller index of (003) and derived from a layered rock salt structure, and a second diffraction peak corresponding to a Miller index of (104) and derived from a cubic rock salt structure in an X-ray powder diffraction (XRD) pattern, wherein an intensity ratio ($I_1/I_2$) of the first diffraction peak to the second diffraction peak is about 7 or greater.

15 Claims, 9 Drawing Sheets

(51) Int. Cl.
  *H01M 4/36*    (2006.01)
  *H01M 10/054*  (2010.01)
  *H01M 4/525*   (2010.01)
  *H01M 4/505*   (2010.01)
  *C01G 45/12*   (2006.01)
  *C01G 49/00*   (2006.01)
  *C01G 51/00*   (2006.01)
  *C01G 53/00*   (2006.01)
  *H01M 4/62*    (2006.01)

(52) U.S. Cl.
  CPC ........ *C01P 2002/54* (2013.01); *C01P 2004/03* (2013.01); *C01P 2006/40* (2013.01); *H01M 4/625* (2013.01); *H01M 10/054* (2013.01); *Y02E 60/122* (2013.01); *Y02P 70/54* (2015.11)

(56) References Cited

U.S. PATENT DOCUMENTS

| | | |
|---|---|---|
| 8,815,449 B2 | 8/2014 | Inoue et al. |
| 2010/0248001 A1 | 9/2010 | Kuze et al. |
| 2010/0261051 A1 | 10/2010 | Okada et al. |
| 2010/0323232 A1 | 12/2010 | Kuze et al. |
| 2011/0003191 A1 | 1/2011 | Kuze et al. |
| 2011/0003192 A1 | 1/2011 | Kuze et al. |
| 2011/0008668 A1* | 1/2011 | Makidera ............ H01M 2/1653 429/144 |
| 2011/0121240 A1* | 5/2011 | Amine ................ H01M 4/0402 252/502 |
| 2011/0159345 A1 | 6/2011 | Makidera et al. |
| 2012/0015230 A1 | 1/2012 | Kuze et al. |
| 2012/0208079 A1 | 8/2012 | Sakai et al. |
| 2015/0093644 A1 | 4/2015 | Han et al. |

OTHER PUBLICATIONS

Zhao et al., "Synthesis, characterization, and electrochemistry of cathode material Li [Li0.2Co0.13Ni0.13Mn0.54]O2 using organic chelating agents for lithium-ion batteries", Journal of Power Sources, 228, 2013, pp. 206-213.

* cited by examiner

CATHODE ACTIVE MATERIAL, CATHODE INCLUDING THE CATHODE ACTIVE MATERIAL, AND SODIUM SECONDARY BATTERY INCLUDING THE CATHODE

CROSS-REFERENCE TO RELATED APPLICATIONS

This application claims priority to and the benefit of Korean Patent Application No. 10-2013-0125546, filed on Oct. 21, 2013, in the Korean Intellectual Property Office, and all the benefits accruing therefrom under 35 U.S.C. §119, the content of which is incorporated herein in its entirety by reference.

BACKGROUND

1. Field

The present disclosure relates to a cathode active material, a cathode including the cathode active material, and a sodium secondary battery including the cathode.

2. Description of the Related Art

As the demand for portable electronic devices, such as video cameras, cellular phones, and notebook PCs which are lightweight and provide high performance has increased, numerous studies to develop high capacity and high energy density batteries for use as power supply devices in such devices have been performed.

Lithium batteries have been mainly used for commercial applications since they enable rapid charging and have energy densities per unit weight that are about 3 times higher than those of lead storage batteries, nickel-cadmium batteries, nickel hydrogen batteries, and nickel zinc batteries.

On the other hand, lithium batteries have safety limitations due to the high reactivity of lithium, and lithium is relatively expensive.

Sodium batteries have been actively studied for use as medium- to large-sized batteries for power storage system and/or in electric vehicles since they are environmentally friendly and have excellent price competitiveness compared to lithium batteries. Also, sodium batteries have high energy storage characteristics.

Sodium transition metal oxides including transition metals such as manganese (Mn), iron (Fe), nickel (Ni), cobalt (Co), vanadium (V), or chromium (Cr) may be used as cathode active materials for sodium batteries.

Sodium transition metal oxides have structural advantages such as higher theoretical capacity than polyvalent anion including phosphorous oxides such as phosphates, or fluorophosphates, and provide sufficient transfer paths for sodium ions in their crystal structures.

However, electrodes including sodium transition metal oxides have poor lifetime characteristics since they rapidly deteriorate due to transition of the crystal structure according to variations in the oxidation number of a central metal during charging or discharging, and also have a poor discharge capacity since the content of inert sodium in the crystal structure is high.

Accordingly, there remains a need for cathode active materials for sodium secondary batteries having improved discharge capacity and lifetime characteristics.

SUMMARY

Provided is a cathode active material for a sodium secondary battery having improved electrical conductivity and structural stability.

Provided is a cathode including the cathode active material.

Provided is a sodium secondary battery including the cathode.

Provided are methods for preparing cathode active material.

Additional aspects will be set forth in part in the description which follows and, in part, will be apparent from the description.

According to an aspect, a cathode active material includes a composite transition metal oxide including: sodium; a first transition metal; and a second transition metal, wherein the composite transition metal oxide has a first diffraction peak corresponding to a Miller index of (003) and derived from a layered rock salt structure, and a second diffraction peak corresponding to a Miller index of (104) and derived from a cubic rock salt structure in a X-ray powder diffraction (XRD) pattern, wherein an intensity ratio ($I_1/I_2$) of the first diffraction peak to the second diffraction peak is about 7 or greater.

According to another aspect, a cathode includes the cathode active material.

According to another aspect, a sodium secondary battery includes: the cathode; an anode; and an electrolytic solution including sodium ions.

According to another aspect, a method of preparing a cathode active material includes: dissolving a first transition metal precursor and a second transition metal precursor in a solvent to prepare a first solution; contacting the first solution with a second solution including a precipitator and a chelating agent to obtain a precipitate; mixing the precipitate with a sodium compound to obtain a mixture; and calcining the mixture to prepare the cathode active material.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
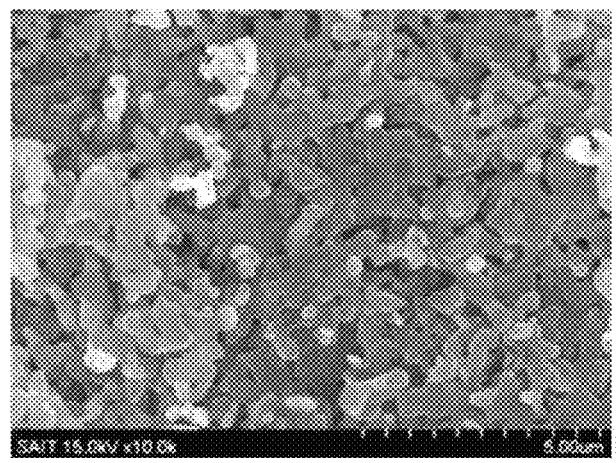
FIGS. 1A and 1B are scanning electron microscopic (SEM) images of a cathode active material prepared according to Example 1.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or."

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A C rate means a current which will discharge a battery in one hour, e.g., a C rate for a battery having a discharge capacity of 1.6 ampere-hours would be 1.6 amperes.

"Alkyl" as used herein means a straight or branched chain, saturated, monovalent hydrocarbon group (e.g., methyl or hexyl).

A (meth)acrylate group is inclusive of an acrylate (H2C=CH—C(=O)O—) group or a methacrylate group (H2C=C(CH3)-C(=O)O—).

"Transition metal" as defined herein refers to an element of Groups 3 to 12 of the Periodic Table of the Elements.

Hereinafter, a cathode active material, a cathode including the cathode active material, and a sodium secondary battery including the cathode active material will be disclosed in further detail. In the present specification, sodium batteries refer to sodium secondary batteries unless otherwise specified.

According to an embodiment, a cathode active material comprises a composite transition metal oxide comprising sodium; a first transition metal oxide, and a second transition metal oxide, wherein the composite transition metal oxide has a first diffraction peak corresponding to a Miller index of (003) derived from a layered rock salt structure, and a second diffraction peak corresponding to a Miller index of (104) and derived from a cubic rock salt structure in an X-ray powder diffraction (XRD) pattern of the composite transition metal oxide, wherein the first diffraction peak and the second diffraction peak have an intensity ratio ($I_1/I_2$) of about 7 or greater, wherein $I_1$ is an intensity of the first diffraction peak and $I_2$ is an intensity of the second diffraction peak.

While not wanting to be bound by theory, it is understood that the composite transition metal oxide may have improved structural stability by reducing the content of the cubic rock salt structure. As a result, a sodium secondary battery including the composite transition metal oxide may have an improved initial discharge capacity, improved high-rate characteristics, and improved lifetime characteristics.

The composite transition metal oxide has improved crystallinity, and primarily includes portion having a layered rock salt crystal structure, and contains a minor or insignificant amount of a portion having a cubic rock salt crystal structure. Since otherwise available composite transition metal oxides include a significant amount of the cubic rock salt structure in addition to the layered rock salt structure, cation mixing occurs. Cation mixing refers to a phenomenon in which transition metal ions separated from the cubic rock salt structure are inserted into a transfer path of sodium ions during the charge/discharge process of the composite transition metal oxide so that transfer of the sodium ions is blocked and structural stability of the composite transition metal oxide is degraded. Further, cation mixing results in a reduction in the structural stability of the composite transition metal oxide, and resultantly, a decrease in the discharge capacity and lifetime characteristics of a sodium battery. Also, the composite transition metal oxide according to an embodiment may inhibit cation mixing by greatly reducing the content of the cubic rock salt structure, as shown by the peak intensities of the first diffraction peak and second diffraction peak, e.g., peaks having Miller indices of (003) and (104), respectively, in the XRD pattern in FIG. 2. Therefore, the structural stability of the composite transition metal oxide is improved so that a discharge capacity and lifetime characteristics of the sodium secondary batteries may be also improved.

For instance, the intensity $I_1$ of the first diffraction peak, e.g., the (003) peak, and the intensity $I_2$ of the second diffraction peak, e.g., the (104) peak, may have an intensity ratio ($I_1/I_2$) of 10 or higher. For instance, the intensity $I_1$ of the first diffraction peak and the intensity $I_2$ of the second diffraction peak may have an intensity ratio ($I_1/I_2$) of 15 or higher. For instance, the intensity $I_1$ of the first diffraction peak and the intensity $I_2$ of the second diffraction peak may have an intensity ratio ($I_1/I_2$) of 20 or higher. For instance, the intensity $I_1$ of the first diffraction peak and the intensity $I_2$ of the second diffraction peak may have an intensity ratio ($I_1/I_2$) of 7 to 100, specifically 10 to 90, more specifically 15 to 80.

In the composite transition metal oxide, the first diffraction peak may occur at a diffraction angle (2θ) 15.50°±0.50°, and the second diffraction peak may occur at a diffraction angle (2θ) 48.50°±0.50°.

For instance, in the XRD spectrum of the composite transition metal oxide, a first diffraction peak having the Miller indices (003) and derived from the layered rock salt structure may occur at a diffraction angle (2θ) 15.50°±0.50°, and a third diffraction peak corresponding to the Miller indices (102) and derived from the cubic rock salt structure may occur at a diffraction angle (2θ) 39.00°±0.50°, and the intensity $I_1$ of the first diffraction peak and the intensity $I_3$ of the third diffraction peak may be in an intensity ratio ($I_1/I_3$) of about 10 or higher.

For instance, the intensity $I_1$ of the first diffraction peak and the intensity $I_3$ of the third diffraction peak may have an intensity ratio ($I_1/I_3$) of about 15 or higher. For instance, the intensity $I_1$ of the first diffraction peak and the intensity $I_3$ of the third diffraction peak may have an intensity ratio ($I_1/I_3$) of about 20 or higher. For instance, the intensity $I_1$ of the first diffraction peak and the intensity $I_3$ of the third diffraction peak may have an intensity ratio ($I_1/I_3$) of about 25 or higher. For instance, the intensity $I_1$ of the first diffraction peak and the intensity $I_3$ of the third diffraction peak may have an intensity ratio ($I_1/I_3$) of 30 or higher. For instance, the intensity $I_1$ of the first diffraction peak and the intensity $I_3$ of the third diffraction peak may have an intensity ratio ($I_1/I_3$) of about 40 or higher. For instance, the intensity $I_1$ of the first diffraction peak and the intensity $I_3$ of the third diffraction peak may have an intensity ratio ($I_1/I_3$) of about 10 to about 100, specifically 15 to 90, more specifically 20 to 80.

The composite transition metal oxide in the cathode active material may be represented by the following Formula 1:

$$Na_xMO_{2+d}$$ Formula 1 wherein M is two or more transition metal elements selected from Groups 4 to 12 of Periodic Table of the Elements, 0.5≤x<1, and −0.3≤d<1.

For instance, the composite transition metal oxide may be represented by the following Formula 2:

$$Na_xMa_zMb_vO_{2+d}$$ Formula 2 wherein Ma is one or more elements selected from iron (Fe), ruthenium (Ru), osmium (Os), chromium (Cr), molybdenum (Mo) and tungsten (W), Mb is one or more elements selected from Groups 4, 5, 7, 9 and 10 of Periodic Table of the Elements, 0.5≤x<1, 0.3≤z≤0.5, 0.5≤v≤0.7, z+v=1, and −0.3≤d<1.

For instance, the composite transition metal oxide in the cathode active material may be represented by the following Formula 3:

$$Na_xMa_zMb_vO_{2+d}$$ Formula 3 wherein Ma is one or more elements selected from iron (Fe), and chromium (Cr), Mb is one or more elements selected from manganese (Mn), cobalt (Co), nickel (Ni), vanadium (V) and titanium (Ti), 0.5≤x<1, 0.3≤z≤0.5, 0.5≤v≤0.7, z+v=1, and −0.3≤d<1.

For instance, the composite transition metal oxide in the cathode active material may be represented by the following Formula 4:

Na$_x$Fe$_z$Mb$_v$O$_2$                                    Formula 4 wherein Mb is one or more elements selected from Mn, and Ni, 0.5≤x<1, 0.3≤z≤0.5, z+v=1, and 0.5≤v≤0.7.

The composite transition metal oxide in the cathode active material may additionally include carbon on the surface thereof. The electrical conductivity of batteries may be improved by additionally including carbon on the surface of the composite transition metal oxide.

The surface of the composite transition metal oxide in the cathode active material may have a carbon content of about 5 atomic percent (atom %) or greater when determined by Energy Dispersive X-ray spectroscopy (EXD). Sodium secondary batteries including the composite transition metal oxide may have improved high-rate characteristics when a carbon content on the surface of the composite transition metal oxide is about 5 atom % or greater. For instance, the surface of the composite transition metal oxide may have a carbon content of about 5 atom % to about 20 atom %, when calculated from the EDX spectrum. For instance, the surface of the composite transition metal oxide may have a carbon content of about 5 atom % to about 10 atom %, when calculated from the EDX spectrum, specifically 6 atom % to 10 atom %.

Primary particles of the composite transition metal oxide in the cathode active material may have an average diameter of about 0.5 micrometers (μm) or more. For instance, primary particles of the composite transition metal oxide may have an average diameter of about 0.5 μm to about 10 μm. For instance, primary particles of the composite transition metal oxide may have an average diameter of about 1 μm to about 10 μm. For instance, primary particles of the composite transition metal oxide may have an average diameter of about 0.5 μm to about 5 μm. For instance, primary particles of the composite transition metal oxide may have an average diameter of about 1 μm to about 5 μm. The primary particles of the composite transition metal oxide have small average diameters as described above so that sodium secondary batteries may have improved charge and discharge characteristics.

Secondary particles formed by binding a plurality of primary particles of the composite transition metal oxide in the cathode active material may have an average diameter of about 5 μm or more. For instance, the secondary particles of the composite transition metal oxide may have an average diameter of about 5 μm to about 50 μm. For instance, the secondary particles of the composite transition metal oxide may have an average diameter of about 10 μm to about 50 μm. For instance, the secondary particles of the composite transition metal oxide may have an average diameter of about 10 μm to about 15 μm.

The composite transition metal oxide in the cathode active material may have a Brunauer-Emmett-Teller (BET) specific surface area of about 5 square meters per gram (m$^2$/g) or more. For instance, the composite transition metal oxide may have a BET specific surface area of about 5 m$^2$/g to about 50 m$^2$/g. For instance, the composite transition metal oxide may have a BET specific surface area of about 5 m$^2$/g to about 10 m$^2$/g. The composite transition metal oxide has the above-mentioned large BET specific surface areas to increase a contact area with an electrolyte so that sodium secondary batteries may have improved high-rate characteristics.

The composite transition metal oxide in the cathode active material may have an electrical resistance of about 1×10$^6$ ohms (Ω) or less at a load of about 20 kiloNeutons (kN) or more. For instance, the composite transition metal oxide may have an electrical resistance of about 0.8×10$^6$ Ω or less, specifically 0.001×10$^6$ Ω to 0.8×10$^6$ Ω, more specifically 0.01×10$^6$ Ω to 0.5×10$^6$ Ω, at a load of about 20 kN or more. For instance, the composite transition metal oxide may have an electrical resistance of about 0.5×10$^6$ Ω or less at a load of about 20 kN or more. For instance, the composite transition metal oxide may have an electrical resistance of about 0.3×10$^6$ Ω or less at a load of about 20 kN or more. The composite transition metal oxide has a low electrical resistance, i.e., a high electrical conductivity, so that sodium batteries including the composite transition metal oxide may have improved high-rate characteristics.

Regarding the cathode active material, a solid electrolyte interface (SEI) formed on the surface of the composite transition metal oxide may have a thickness of about 5 nanometers (nm) or less after performing 30 charge-discharge cycles on a sodium battery including the composite transition metal oxide at a constant current of about 0.1 C rate in a voltage range of about 2.0 V to about 4.2 V vs. Na metal. For instance, the SEI may have a thickness of about more than 0 nm to about 5 nm. For instance, the SEI may have a thickness of about more than 0 nm to about 4 nm. For instance, the SEI may have a thickness of about more than 0 nm to about 3 nm, or 0.1 nm to 5 nm. The SEI formed on the surface of the composite transition metal oxide has a small thickness so that a sodium secondary battery including the composite transition metal oxide may have improved cycle characteristics.

For instance, an intensity P$_{CF2}$ of a peak corresponding to a —CF$_2$ group, represented in the vicinity of 290 eV, and an intensity P$_{CO3}$ of a peak corresponding to a —OC(=O)O— group represented in the vicinity of 289 eV in an XPS spectrum of the surface of the composite transition metal oxide may have an intensity ratio P$_{CO3}$/P$_{CF2}$ of about 0.1 or less. That is, since the peak corresponding to the —OC(=O)O— group, which is understood to result in a high resistance, has a low intensity in the XPS spectrum, a resistance of the SEI may be reduced, and thus, cycle characteristics of sodium secondary batteries may be improved.

For instance, a resistance, e.g., a real impedance (Z'), corresponding to the SEI formed on the surface of the composite transition metal oxide, wherein the resistance is determined from a contact point between the X axis and an x intercept in a Nyquist plot measured by impedance spectroscopy, may be about 5000 ohms-square centimeters (Ωcm$^2$) or less. While not wanting to be bound by theory, it is understood that charge-discharge characteristics of sodium secondary batteries including the composite transition metal oxide may be improved since the SEI has a low resistance value of about 5000 Ωcm$^2$ or less so that diffusion of sodium ions passing through the SEI layer is facilitated. For instance, a resistance corresponding to the SEI layer is understood to develop when the sodium ions diffuse through the SEI layer. For instance, a resistance corresponding to the SEI formed on the surface of the composite transition metal oxide may be about 500 Ωcm$^2$ to about 5000 Ωcm$^2$. For instance, a resistance corresponding to the SEI formed on the surface of the composite transition metal oxide may be about 500 Ωcm$^2$ to about 4500 Ωcm$^2$. For instance, a resistance corresponding to the SEI formed on the surface of the composite transition metal oxide may be about 500 $\Omega cm^2$ to about 4000 $\Omega cm^2$.

Cation mixing, which is a phenomenon in which transition metal ions separated from the cubic structure are inserted into a transfer path of sodium ions transferred between layers of the layered rock salt structure, may not be generated in the composite transition metal oxide of the cathode active material during charging and discharging operations. Due to the reduction or prevention of the cation mixing, the crystal structure of the composite transition metal oxide is stabilized, and thus, charge and discharge characteristics of the sodium secondary batteries may be improved.

The cathode active material substantially does not include lithium. That is, the cathode active material including the composite transition metal oxide does not intentionally include lithium except in an unintended extremely small amount of residual lithium. However, when the cathode active material intentionally includes a small amount of lithium and the lithium is positioned in the layered structure, the layered structure may be stabilized so that a structural variation or collapse of the cathode active material due to charge and discharge may be prevented.

Another embodiment provides a cathode including the above-mentioned cathode active material.

For instance, the cathode may be prepared as follows.

For instance, a cathode active material composition comprising a cathode active material including the above-mentioned composite transition metal oxide, a conducting agent, a binder, and a solvent is prepared. The cathode active material composition may be directly coated on a current collector to manufacture a cathode plate. Alternatively, the cathode plate may be manufactured by casting the cathode active material composition onto a separate support, delaminating a film from the support, and laminating the film delaminated from the support onto a current collector. The cathode is not limited to the above-mentioned form, and may be prepared in other forms.

The cathode may additionally include one or more additional cathode active materials that are different from the composite transition metal oxide.

Examples of the additional cathode active materials that may be included include, but are not limited to, oxides represented by the formula $NaM^1{}_aO_2$, such as $NaFeO_2$, $NaMnO_2$, $NaNiO_2$ and $NaCoO_2$; oxides represented by the formula $Na_{0.44}Mn_{1-a}M^1{}_aO_2$; and oxides represented by the formula $Na_{0.7}Mn_{1-a}M^1{}_aO_{2.05}$, wherein $M^1$ is one or more transition metal elements and $0 \leq a < 1$; oxides represented by the formula $Na_bM^2{}_cSi_{12}O_{30}$ such as $Na_6Fe_2Si_{12}O_{30}$ and $Na_2Fe_5Si_{12}O_{30}$, wherein $M^2$ is one or more transition metal elements, $2 \leq b \leq 6$, and $2 \leq c \leq 5$; oxides represented by the formula $Na_dM^3{}_eSi_6O_{18}$ such as $Na_2Fe_2Si_6O_{18}$ and $Na_2MnFeSi_6O_{18}$, wherein $M^3$ is one or more transition metal elements, $3 \leq d \leq 6$, and $1 \leq e \leq 2$; oxides represented by the formula $Na_fM^4{}_gSi_2O_6$ such as $Na_2FeSiO_6$, wherein $M^4$ is one or more elements selected from transition metal elements, Mg, and Al, $1 \leq f \leq 2$, and $1 \leq g \leq 2$; phosphates such as $NaFePO_4$ and $Na_3Fe_2(PO_4)_3$; borates such as $NaFeBO_4$ and $Na_3Fe_2(BO_4)_3$; and fluorides represented by the formula $Na_hM^5F_6$ such as $Na_3FeF_6$ and $Na_2MnF_6$, wherein $M^5$ is one or more transition metal elements and $2 \leq h \leq 3$. The additional cathode active material may be any suitable cathode active material as long as it does not adversely affect the performance of the sodium secondary battery.

Examples of the conducting agent may include one or more carbonaceous materials with a high specific surface area, such as carbon black, activated carbon, acetylene black, and graphite. The conducting agent may be in any suitable form, e.g., particles, tubes, fibers, or wires. Examples of the conducting agent may additionally include electrically conductive carbon fibers, such as vapor grown carbon fibers manufactured by carbonizing pitch, e.g., petroleum, coal, or coal tar, at high temperatures, or carbon fibers manufactured from acryl fibers, such as polyacrylonitrile. The carbon fibers and the carbonaceous materials with a high specific surface area may be used in combination. The electrical conductivity of sodium secondary batteries may be further improved by using both the carbon fibers and the carbonaceous materials with a high specific surface area. Further, examples of the conducting agent may include metal-based conducting agents having lower electrical resistance than those of the cathode active materials. The metal-based conducting agents may be materials which are neither oxidized nor dissolved in the charge and discharge potential range of the cathode. For instance, examples of the conducting agent may include corrosion resistant metals, such as titanium and gold, carbides such as SiC and WC, and nitrides such as $Si_3N_4$ and BN. However, the conducting agent used in the manufacturing of the cathode is not limited to the above-mentioned examples, and may be any suitable material that may be used as a conducting agent in the art.

Examples of the binder may include polymers of fluoride compounds, i.e., fluorine-based polymers. For instance, examples of the fluoride compounds may include a fluorinated C1-C18 alkyl methacrylate, perfluoroalkyl (meth) acrylates such as perfluorododecyl (meth)acrylate, perfluoro n-octyl (meth)acrylate and perfluoro n-butyl (meth)acrylate, perfluoroalkyl substituted alkyl (meth)acrylates such as perfluorohexylethyl (meth)acrylate and perfluorooctylethyl (meth)acrylate, perfluorooxyalkyl (meth)acrylates such as peril uorododecyloxyethyl (meth)acrylate, perfluorodecyloxyethyl (meth)acrylate and others, fluorinated C1-C18 alkyl crotonates, fluorinated C1-C18 alkyl malate, fluorinated C1-C18 alkyl malate fumarate, fluorinated C1-C18 alkyl itaconate, and fluorinated alkyl substituted olefins having 2 to 10 carbon atoms and 1 to 17 fluorine atoms such as perfluorohexyl ethylene, and fluorinated olefins having about 2 carbon atoms to about 10 carbon atoms and about 1 fluorine atom to about 20 fluorine atoms in which fluorine atoms are bonded to double bonded carbons, such as tetrafluoroethylene, trifluoroethylene, vinylidene fluoride or hexafluoropropylene.

Further, examples of the binder may include copolymers of fluoride compounds and monomers including an ethylenic double bond that does not include fluorine atoms.

Further, examples of the binder may include non-fluorine based polymers.

The non-fluorinated polymers are polymers that do not include fluorine. For instance, the non-fluorinated polymers may be addition polymers of monomers including an ethylenic double bond that does not include fluorine atoms. Examples of the monomers may include: (cyclo)alkyl C1-C22 (meth)acrylates such as methyl (meth)acrylate, ethyl (meth)acrylate, n-butyl (meth)acrylate, isobutyl (meth) acrylate, cyclohexyl (meth)acrylate, 2-ethylhexyl (meth) acrylate, isodecyl (meth)acrylate, lauryl (meth)acrylate, and octadecyl (meth)acrylate; aromatic ring-containing (meth) acrylates such as benzyl (meth)acrylate and phenylethyl (meth)acrylate; mono(meth)acrylates of alkylene glycol or dialkylene glycol having 2 to 4 carbon atoms at alkylene groups thereof such as 2-hydroxyethyl (meth)acrylate, 2-hydroxypropyl (meth)acrylate, and diethylene glycol mono (meth)acrylate; polyglycerin mono(meth)acrylates having a polymerization degree of from 1 to 4; (meth)acrylate ester-based monomers such as multifunctional (meth)acrylates, e.g., polyethylene glycol di(meth)acrylate having a polymerization degree of from 1 to 100, polypropylene glycol di(meth)acrylate having a polymerization degree of from 1 to 100, 2,2-bis(4-hydroxyethylphenyl)propane di(meth) acrylate, and trimethylol propane tri(meth)acrylate; (meth) acrylamide based monomers such as (meth)acrylamide and (meth)acrylamide based derivatives, e.g., N-methylol (meth) acrylamide and diacetone acrylamide; cyano group-containing monomers such as (meth)acrylonitrile, 2-cyanoethyl (meth)acrylate, and 2-cyanoethyl acrylamide; stylene-based monomers such as styrene and styrene derivatives having 7 to 18 carbon atoms, e.g., α-methyl styrene, vinyl toluene, p-hydroxy styrene, and divinyl benzene; diene-based monomers such as alkadienes having 4 to 12 carbon atoms, e.g., butadiene, isoprene, and chloroprene; alkenyl ester-based monomers such as vinyl carboxylate esters having 2 to 12 carbon atoms, e.g., vinyl acetate, vinyl propionate, vinyl butyrate and vinyl octanoate, and (meth)allyl carboxylate esters having 2 to 12 conducting agent atoms, e.g., (meth) allyl acetate, (meth)allyl propionate, and (meth)allyl octanoate; epoxy group-containing monomers such as glycidyl (meth)acrylate and (meth)allyl glycidyl ether; mono-olefins such as mono-olefins having 2 to 12 carbon atoms, e.g., ethylene, propylene, 1-butene, 1-octene, and 1-dodecene; monomers containing halogen atoms except fluorine such as monomers containing chlorine, bromine or iodine atom, vinyl chlorides, and vinylidene chlorides; (meth)acrylates such as acrylic acid and methacrylic acid; and conjugate double bond-containing monomers such as butadiene and isoprene. Examples of the monomers may include polyethylene, polypropylene, etc. Further, examples of the addition polymers may include copolymers such as ethylene-vinyl acetate copolymers, styrene-butadiene copolymers, and ethylene-propylene copolymers. Further, the vinyl carboxylate ester copolymers such as polyvinyl alcohols may be partially or fully saponified.

Further, examples of the binder may include: polysaccharides such as starch, methyl cellulose, carboxymethyl cellulose, hydroxymethyl cellulose, hydroxyethyl cellulose, hydroxypropyl cellulose, carboxymethylhydroxyethyl cellulose and nitro cellulose, and derivatives thereof; phenolic resins; melamine resins; polyurethane resins; urea resins; polyamide resins; polyimide resins; polyamideimide resins; petroleum pitches; coal pitches; and others. A combination of binders may be used. Further, the binder may function as a thickener in the electrode mixture.

Specifically, examples of the binder may include, but are not limited to, vinylidene fluoride/hexafluoropropylene copolymer, polyvinylidene fluoride (PVDF), polyacrylonitrile, polymethyl methacrylate, polytetrafluoroethylene, a styrene butadiene rubber-based polymer, and a combination thereof. The binder may be any suitable material that is capable of being used as a binder.

Examples of the solvent may include, but are not limited to, N-methyl pyrrolidone, acetone, and water. The solvent may be any suitable material that is capable of being used as a solvent.

Examples of the current collector material may include, but are not limited to, metals such as nickel, aluminum, titanium, copper, gold, silver, platinum, aluminum alloy, and stainless steel, materials formed by subjecting a carbonaceous material, activated carbon fiber, nickel, aluminum, zinc, copper, tin, lead, or alloys thereof to plasma spraying or arc spraying, and conductive films obtained by dispersing a conducting agent into a rubber or a resin such as a styrene-ethylene-butylene-styrene (SEBS) copolymer. Aluminum may be used to form the current collector. Aluminum is easily formed and inexpensive. A shape of the current collector is not particularly limited. Examples of the current collector shape may include a thin film shape, a plate shape, a mesh shape, a net shape, a punched shape, an embossed shape, or a combination thereof, such as a meshed plate shape. Examples of the current collector shape may also include a shape in which irregularities are formed on the surface of the current collector by an etching treatment.

Contents of the cathode active material, the conducting agent, the binder and the solvent may be in any suitable range, are can be determined by one of skill in the art of sodium secondary batteries without undue experimentation. One or more of the conducting agent, binder and solvent may be omitted if desired depending on use and structure of the sodium secondary batteries.

Another embodiment provides a sodium secondary battery including the above-mentioned cathode, an anode, and an organic electrolytic solution. For instance, the sodium secondary battery may be prepared as follows.

First, the cathode is prepared as described above.

Next, the anode is prepared.

Examples of a material for preparing the anode may include, but are not limited to, sodium metal, a sodium metal-based alloy, a sodium intercalation compound, and a carbonaceous material. Examples of the material for the preparing the anode may also include any suitable material that is capable of being used as an anode active material, such as a material including sodium, or a material that is capable of intercalation and deintercalation of sodium.

Since the anode can determine the capacity of the sodium secondary battery, examples of the material for preparing the anode may include a sodium metal. Examples of the sodium metal-based alloys may include aluminum, tin, indium, calcium, titanium, vanadium, and alloys of sodium.

For instance, the anode may include sodium in a metallic state and having a thickness of from about 3 μm to about 500 μm. The anode may have various shapes, such as a film shape, a sheet shape, a foil shape, or a net shape, or may be a porous body, a foamed body, or a non-woven fabric body.

Besides sodium metal or a sodium alloy, carbonaceous materials having a graphene structure may be used as the anode active material. Examples of the anode may include a mixed anode comprising materials such as graphite, or graphitized carbon, a combination of carbonaceous materials and metals or metal alloys, or a combination thereof. Examples of the carbonaceous materials may include carbonaceous materials that can intercalate and deintercalate sodium ions, such as natural graphite, artificial graphite, mesophase carbon, expanded graphite, carbon fiber, vapor grown carbon fiber, pitch-based carbonaceous material, needle cokes, petroleum cokes, polyacrylonitrile-based carbon fiber and carbon black, and amorphous carbonaceous materials, e.g., those synthesized by pyrolysis of five-membered or six-membered cyclic hydrocarbons or cyclic oxygen-containing organic compounds.

The anode may be manufactured as follows when the anode active material is in the form of powder. The anode may be manufactured in the same manner as the cathode except that the anode active material is used instead of the composite cathode active material. Further, the same conducting agent, binder, and solvent as used for the cathode active material composition may be used to form the anode active material composition.

For instance, an anode active material composition may be prepared by mixing an anode active material, a conducting agent, a binder, and a solvent, and an anode plate may be manufactured by directly coating the anode active material composition on a copper current collector. Alternatively, the anode plate may be manufactured by casting the anode active material composition onto a separate support, delaminating an anode active material film from the support, and laminating the anode active material film onto the copper current collector.

Examples of the anode current collector may include any suitable current collector, without being limited to materials, shapes, or manufacturing methods thereof. For instance, examples of the anode current collector may include copper foils with a thickness of from about 10 μm to about 100 μm, perforated copper foils having a thickness of from about 10 μm to about 100 μm and a hole diameter of from about 0.1 mm to about 10 mm, extended metals, and foamed metal sheets. Examples of materials for forming the anode current collector may include stainless steel, titanium, and nickel, in addition to copper.

Contents of the anode active material, conducting agent, binder, and solvent correspond to those that are used for preparing sodium secondary batteries, and can be determined by one of skill in the art without undue experimentation.

Next, a separator is prepared.

The sodium secondary battery may additionally include a separator interposed between the cathode and the anode.

The separator is not limited to a particular separator composition as long as the separator composition is suitably durable in the operating conditions of the sodium secondary battery. Examples of the separator may include porous films of polymeric non-woven fabrics, such as polypropylene non-woven fabric, polyphenylene sulfide non-woven fabric and others, and porous films of olefin resins such as polyethylene or polypropylene, and a combination thereof.

Further, examples of the separator may have low resistance to migration of ions in an electrolyte and exhibit excellent electrolyte-retaining ability. For instance, examples of the separator include glass fiber, polyester, Teflon, polytetrafluoroethylene (PTFE), or a combination thereof. The separator may be used in a non-woven fabric form or a woven fabric form.

For instance, the separator may be manufactured according to the following method.

A separator composition is prepared by mixing a polymer resin, a filler, and a solvent. A separator may be formed by directly coating the separator composition on the top of an anode active material layer and drying the separator composition coated on the anode active material layer. Alternatively, the separator may be formed by casting the separator composition onto a support, drying the separator composition cast onto the support, delaminating a separator film from the support, and laminating the separator film delaminated from the support on the top of the anode active material layer.

Examples of the polymer resin used to manufacture of the separator may be any suitable material that is used as a binder for an electrode plate. For instance, examples of the polymer resin may include polyethylene, polypropylene, vinylidenefluoride/hexafluoropropylene copolymer, polyvinylidene fluoride (PVDF), polyacrylonitrile, polymethyl methacrylate, or a combination thereof. Examples of the filler used in manufacturing the separator may include inorganic particles and the like, and examples of the solvent may include any suitable solvent that is used as a solvent for dissolving the polymer resin and forming pores within the polymer resin during drying.

Further, the separator may be separately manufactured by other well-known methods and the separator may be laminated on top of the anode active material layer. For instance, a dry method may be used, which includes melting polypropylene, or polyethylene, extruding the molten material into a film, annealing the film and growing the crystal domains at low temperatures, and stretching the annealed film in that state, thereby extending the amorphous region to form a microporous film. For instance, a wet method may also be used, which includes mixing low molecular weight materials such as a hydrocarbon solvent with polypropylene, or polyethylene, forming a film from the mixture, and then forming a microporous film by eliminating the solvent or low molecular weight materials, aggregated in an amorphous phase of the film to form an island phase, with another volatile solvent.

Further, the separator may additionally include additives such as nonconductive particles, other fillers, or fiber compounds for controlling strength, hardness, or thermal shrinkage. For instance, the separator may additionally include inorganic particles to have improved oxidation resistance and prevent deterioration of battery characteristics. Examples of the inorganic particles may include alumina ($Al_2O_3$), silica ($SiO_2$), and titania ($TiO_2$). The inorganic particles may have an average particle diameter of from about 10 nm to about 5 μm. When the average particle diameter is less than about 10 nm, crystallinity of the inorganic particles may be lowered, and thus the effect of adding the inorganic particles may low. When the average particle diameter is higher than about 5 μm, the inorganic particles may not be easily dispersed.

The separator may have a multilayered structure including one or more polymer layers in order to have increased tearing strength or mechanical strength. Examples of the multilayered structure may include a polyethylene/polypropylene laminate, a polyethylene/polypropylene/polyethylene laminate, and a non-woven fabric/polyolefin laminate.

Next, an electrolytic solution is prepared.

The electrolytic solution may be a liquid including sodium in an ionic state and may be obtained by dissolving a sodium salt that becomes an electrolyte into a solvent. The batteries may include an organic electrolytic solution including an organic solvent.

Examples of the sodium salt used as the electrolyte may include, but are not limited to, $NaClO_4$, $NaPF_6$, $NaBF_4$, $NaCF_3SO_3$, $NaN(CF_3SO_2)_2$, $NaN(C_2F_5SO_2)_2$, and $NaC(CF_3SO_2)_3$. The sodium salt may include any suitable material available as a sodium salt in the art. For instance, the sodium salt may include materials in which lithium is substituted for sodium from salts used as lithium salts in lithium batteries.

A concentration of the electrolyte in the organic electrolytic solution may be properly determined in consideration of solubility of the electrolyte in the electrolytic solution. For instance, the electrolyte may have a concentration of from about 0.1 molar (M) to about 5 M. For instance, the electrolyte may have a concentration of from about 0.3 M to about 3 M. For instance, the electrolyte may have a concentration of from about 0.8 M to about 1.5 M. An ionic conductivity of the electrolytic solution may be increased so that an internal resistance of the sodium secondary battery may be lowered when the electrolyte concentration is about 0.1 M or more, and viscosity of the electrolytic solution may be reduced so that the internal resistance of the sodium secondary battery may also be reduced when the electrolyte concentration is about 5.0 M or less.

A polar organic solvent may be used as the organic solvent to dissolve the electrolyte. The electrolytic solution including the polar organic solvent may have a water content of about 200 parts per million (ppm) or less. For instance, the electrolytic solution including the polar organic solvent may have a water content of about 50 ppm or less. For instance, the electrolytic solution including the polar organic solvent may have a water content of about 20 ppm or less. Effects of electrolysis of water on the electrode, particularly a drop in voltage, may be prevented by suppressing the water content in the electrolytic solution including the polar organic solvent.

Aprotic organic solvents may be used as the organic solvent in the organic electrolytic solution. Examples of the organic electrolytic solution for the sodium secondary battery may include, but are not limited to, one or more organic solvents selected from dimethyl ether, diethyl ether, dimethyl carbonate, diethyl carbonate, ethylmethyl carbonate, dipropyl carbonate, methylpropyl carbonate, ethylpropyl carbonate, ethylene carbonate, propylene carbonate, butylene carbonate, methyl acetate, ethyl acetate, n-propyl acetate, dimethyl acetate, methyl propionate, ethyl propionate, γ-butyrolactone, decanolide, valerolactone, mevalonolactone, caprolactone, dibutyl ether, tetraglyme, diglyme, polyethylene glycol dimethyl ether, dimethoxy ethane, 2-methyltetrahydrofuran, 2,2-dimethyltetrahydrofuran, 2,5-dimethyltetrahydrofuran, cyclohexanone, triethylamine, triphenylamine, triethylphosphine oxide, acetonitrile, dimethylformamide, 1,3-dioxolane, and sulfolane. The organic electrolytic solution may include any suitable material that is capable of being used as an organic solvent.

Figure 8:
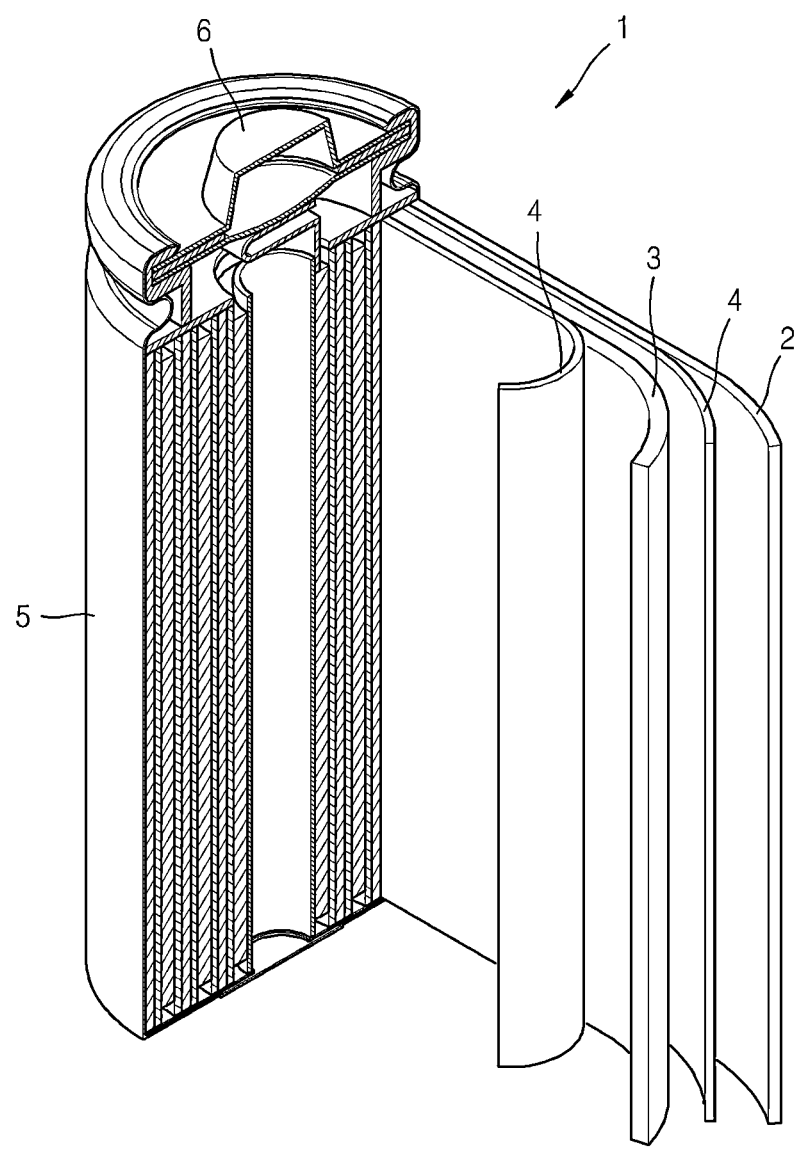
FIG. 8 is a schematic diagram illustrating an embodiment of a sodium secondary battery.

As illustrated in FIG. 8, the sodium secondary battery 1 includes a cathode 3, an anode 2, and a separator 4. The cathode 3, anode 2 and separator 4 are wound or folded, and then housed in a battery case 5. Subsequently, an organic electrolytic solution is injected into the battery case 5, and the battery case 5 is sealed by a cap assembly 6 to complete the sodium secondary battery 1. The battery case 5 may be a cylindrical type, a rectangular type, a thin film type, or other types. The sodium secondary battery may be a large thin film-type battery. The sodium secondary battery may be a sodium ion battery. The sodium secondary battery may be a sodium ion polymer battery.

The separator may be interposed between the cathode and the anode to form a battery assembly. In some embodiments, the battery assembly may be stacked or rolled in a bi-cell structure and impregnated with the electrolyte solution. The resultant is put into a pouch and hermetically sealed, thereby completing the manufacture of a sodium ion polymer battery.

Further, a plurality of battery assemblies may be stacked to form a battery pack that may be used in a device to provide high capacity. For instance, the battery pack may be used in notebook PCs, smart phones, electric vehicles, and other device.

Further, since the sodium secondary battery has excellent storage stability and thermal stability, the sodium secondary battery may be used in an energy storage systems (ESS) or an electric vehicle (EV). For instance, the sodium secondary battery may be used in hybrid vehicles such as plug-in hybrid electric vehicles (PHEV) and other similar vehicle.

Another embodiment provides a method of preparing a cathode active material, the method including: dissolving a first and a second transition metal precursor in a solvent to prepare a first solution; contacting the first solution with a second solution including a precipitator and a chelating agent to obtain a precipitate; mixing the precipitate with a sodium compound to obtain a mixture; and calcining the mixture to prepare the cathode active material.

Examples of the transition metal precursors may include, but are not limited to, transition metal-containing compounds. For example, the transition metal precursors may any suitable compound that is capable of being used as transition metal-containing precursors. For instance, examples of the transition metal precursor may include compounds such as transition metal chlorides, transition metal nitrates, transition metal sulfates, and hydrates thereof.

First, two or more types of transition metal precursors are dissolved into a solvent to prepare the first solution containing two or more transition metals.

The two or more transition metals may be a combination of a first transition metal M1 and a second transition metal M2. For instance, examples of the two or more transition metals may be a combination of Fe and Mn, a combination of Fe and Ni, a combination of Fe and Co, a combination of Fe and Ti, a combination of Mn and Ni, a combination of Mn and Co, a combination of Mn and Ti, a combination of Ni and Co, a combination of Ni and Ti, a combination of Co and Ti, a combination of Fe, Mn, and Ni, a combination of Fe, Mn and Co, a combination of Fe, Mn, and Ti, a combination of Fe, Ni, and Co, a combination of Fe, Ni, and Ti, a combination of Fe, Co, and Ti, a combination of Fe, Mn, Ni, and Co, a combination of Fe, Mn, Ni and Ti, or a combination of Fe, Mn, Ni, Co, and Ti.

The two or more transition metals may have composition ratios of $0.05 \leq M1 \leq 0.95$, $0.05 \leq M2 \leq 0.95$, and $M1+M2=2$. For instance, the two or more transition metals may preferably have composition ratios of $0.3 \leq M1 \leq 0.5$, $0.5 \leq M2 \leq 0.7$, and $M1+M2=1$.

Next, the first solution and the second solution including the precipitator and the chelating agent are brought into contact with each other to obtain a precipitate. The first solution and the second solution may be an aqueous solution.

Examples of the precipitator may include, but are not limited to, LiOH, NaOH, KOH, $Li_2CO_3$, $Na_2CO_3$, $K_2CO_3$, and $(NH_2)_2CO$. The precipitator may be any suitable material that is capable of being used as a precipitator.

In the preparation method, the precipitator may have a content corresponding to about 10 mols or more with respect to 1 mol of the total of the transition metal precursors. For instance, the chelating agent may have a content corresponding to about 10 mols to about 40 mols with respect to 1 mol of the total transition metal precursors, i.e., the total moles of the two or more transition metal precursors, e.g., the first and second transition metal precursors.

In the preparation method, the precipitator in the second solution may have a concentration of about 0.5 moles per liter (mol/L) to about 10 mol/L. For instance, the precipitator may have a concentration of about 1 mol/L to about 8 mol/L.

The chelating agent may be one or more selected from $NH_4OH$, tartaric acid, succinic acid, adipic acid, citric acid, triethanolamine, and polyvinylpyrrolidone.

After contacting, e.g., coordinating, the chelating agent to the transition metals included in the solution to stabilize the transition metals in the solution, the chelating agent is substituted by hydroxyl ions of the precipitator so that a precipitate may be formed in the form of a hydrate. A composite transition metal oxide having a uniform composition may be obtained by coordinating the chelating agent to the transition metals to stabilize the transition metals in the solution and then precipitating the chelating agent in a hydrate form. That is, a composite transition metal oxide having a layered rock salt structure having a high degree of crystallinity, e.g., 80 to 99 percent, can be obtained and it is possible to suppress the formation of other separate phases having a crystal structure that is different from the layered rock salt structure.

In the preparation method, the chelating agent may have a content of about 1.5 mol or more with respect to 1 mol of the total of the transition metal precursors included in the first solution. For instance, the chelating agent may have a content of from about 1.5 mol to about 10 mols with respect to 1 mol of the total of the transition metal precursors. For instance, the chelating agent may have a content of from about 1.5 mol to about 3.5 mols with respect to 1 mol of the total of the transition metal precursors. For instance, the chelating agent may have a content of from about 1.5 mol to about 3 mols with respect to 1 mol of the total of the transition metal precursors. For instance, the chelating agent may have a content of from about 1.5 mol to about 2.5 mols with respect to 1 mol of the total of the transition metal precursors.

For instance, the first solution and the second solution may be brought into contact with each other by a method of adding the second solution to the first solution, a method of adding the first solution to the second solution, or other methods. When contacting the first and second solutions, the solutions may be stirred to form a third solution. The third solution may have a constant pH when the first and second solutions are brought into contact with each other. A precipitate of the solution obtained by contacting the first and second solutions with each other may include two or more transition metals. For instance, the precipitate may be a hydroxide including two or more transition metals. The precipitate may be obtained as a slurry. The precipitate may be recovered by separating solids from a liquid in the slurry. For instance, the separation of solids and liquid may be performed by filtration.

Cleaning, drying, and other operations may be carried out with respect to the recovered precipitate. The precipitator may be removed by cleaning when large amounts of the precipitator and chelating agent adsorbed to the recovered precipitate. Examples of a cleaning solution may include water and water-soluble organic solvents such as alcohol, or acetone. For instance, when the cleaning solution is water, drying may be performed by heat drying, blast drying, vacuum drying, or other types of drying. Heat drying may be conducted at a drying temperature of from about 50° C. to about 300° C. For instance, the drying temperature may be from about 80° C. to about 200° C. For instance, the drying may be carried out for about 10 hours to about 50 hours. For instance, the drying may be carried out for about 20 hours to about 30 hours. The cleaning and drying may be performed two or more times.

A mixture is obtained by mixing the precipitate with a sodium compound.

Examples of the sodium compound may include one or more selected from sodium hydroxide, sodium chloride, sodium nitrate, sodium peroxide, sodium sulfate, sodium hydrogen carbonate, sodium oxalate, sodium carbonate, and a hydrate thereof.

The sodium compound is mixed with the precipitate in an amount corresponding to from about 0.2 or more to about less than 1 of an atomic ratio with respect to the total transition metal amount. For instance, the amount of the sodium compound may be from about 0.3 or more to about less than 1 of an atomic ratio with respect to the total transition metal amount in the precipitate. For instance, the amount of the sodium compound may be from about 0.4 or more to about less than 1 of an atomic ratio with respect to the total transition metal amount in the precipitate. For instance, the amount of the sodium compound may be from about 0.5 or more to about less than 1 of an atomic ratio with respect to the total transition metal amount in the precipitate.

Mixing may be conducted either by a dry process or by a wet process. For simplicity reasons, the mixing may be performed by the dry process. Examples of mixing equipment may include a stirring mixer, a V type mixer, a W type mixer, a ribbon mixer, a drum mixer, and a ball mill.

Subsequently, the mixture is calcined. The calcination may be performed at a temperature of from about 400° C. to about 1200° C. For instance, the calcination may be performed at a temperature of from about 500° C. to about 1000° C. For instance, the calcination may be performed at a temperature of from about 700° C. to about 1000° C. The calcination may be performed at the calcinations temperature during about 0.1 hour to about 20 hours. For instance, the calcination may be performed at the calcination temperature during about 0.5 hour to about 10 hours. For instance, a temperature increase to the calcination temperature may be performed at a temperature increasing rate of from about 50° C./hr to about 400° C./hr, and a temperature decrease to the room temperature may be performed at a temperature decreasing rate of from about 10° C./hr to about 400° C./hr. For instance, the calcination atmosphere may be air, oxygen, nitrogen, argon, or mixed gases thereof. For instance, the calcination atmosphere may be air.

A cathode active material obtained by the calcination may be milled by using a ball mill or a jet mill, and milling and calcination of the cathode active material may be repeated two or more times. Further, the cathode active material may be cleaned or classified.

A composite transition metal oxide prepared by the preparation method may be used for manufacturing a sodium secondary battery having improved initial capacity, high-rate characteristics, and lifetime characteristics due to its improved structural stability.

Hereinafter, examples and comparative examples will be described in more detail to help the understanding of the embodiments. The examples are for illustrative purposes only and are not intended to limit the scope of the embodiments.

EXAMPLES

Preparation of a Cathode Active Material

Example 1

Use of 0.04 mol of a Chelating Agent 1.69 grams (g) of manganese (II) sulfate monohydrate ($MnSO_4 \cdot H_2O$) and 2.78 g of ferrous sulfate heptahydrate ($FeSO_4 \cdot 7H_2O$) were added to 200 mL of distilled water in a polypropylene beaker and dissolved by stirring to obtain a first aqueous solution containing Fe and Mn.

Separately, sodium hydroxide (NaOH) in an amount of 12 g corresponding to 0.3 mol with respect to 0.02 mol of the total moles of manganese (II) sulfate monohydrate and ferrous sulfate heptahydrate, and 28% ammonium hydroxide ($NH_4OH$) in an amount of 4.87 g corresponding to 0.04 mol with respect to 0.02 mol of the total mol of manganese (II) sulfate monohydrate and ferrous sulfate heptahydrate were added to 250 mL of distilled water in a propylene beaker and dissolved by stirring to obtain a second aqueous solution The first aqueous solution was dropped into the second aqueous solution while the second aqueous solution was stirred to obtain a slurry containing a precipitate.

Subsequently, the slurry was filtered, washed with distilled water, and then dried at 100° C. for 24 hours to isolate a precipitate. Further, the composition of the precipitate was analyzed by high frequency inductively coupled plasma (ICP) emission spectroscopic analysis. The obtained mol ratio (i.e., atomic ratio) of Fe:Mn was 0.5:0.5. The precipitate and sodium carbonate were weighted such that a mol ratio (i.e., atomic ratio) of Fe:Na was 0.5:0.67, and then, dry-mixed by using an agar mortar to obtain a mixture. Next, the mixture was put into a calcining container made of alumina, maintained in an air atmosphere at 850° C. for 12 hours in an electric furnace to perform calcination, and cooled to room temperature, thereby completing the preparation of a composite transition metal oxide.

The prepared composite transition metal oxide was $Na_{2/3}Fe_{0.5}Mn_{0.5}O_2$.

Figure 1B:
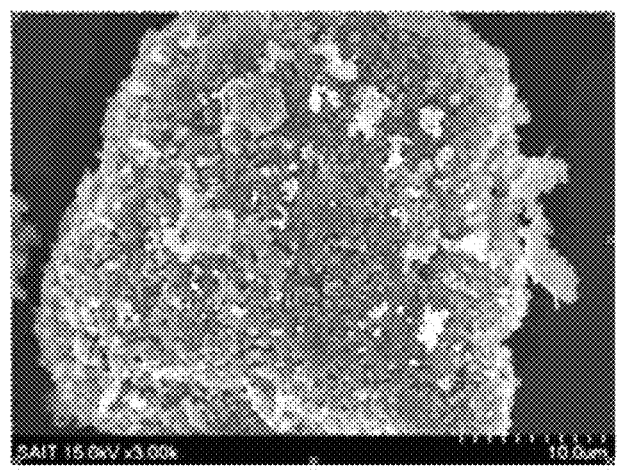

Scanning electron microscopic (SEM) images of the prepared $Na_{2/3}Fe_{0.5}Mn_{0.5}O_2$ are illustrated in FIGS. 1A and 1B. Primary particles of the prepared $Na_{2/3}Fe_{0.5}Mn_{0.5}O_2$ had an average diameter of about 1 μm, and secondary particles of the prepared $Na_{2/3}Fe_{0.5}Mn_{0.5}O_2$ had an average diameter of about 10 μm.

Example 2

Using 0.08 mol of Chelating Agent

A composite transition metal oxide was prepared in the same manner as in Example 1 except that 9.74 g of ammonium hydroxide (0.08 mole) was added in distilled water so that a resulting material was obtained in an amount corresponding to twice the total weight of manganese (II) sulfate monohydrate and ferrous sulfate heptahydrate.

The prepared composite transition metal oxide was $Na_{2/3}Fe_{0.5}Mn_{0.5}O_2$.

Example 3

A composite transition metal oxide was prepared in the same manner as in Example 1 except that nickel (II) sulfate hexahydrate ($NiSO_4 \cdot 6H_2O$) and cobalt (II) sulfate heptahydrate ($CoSO_4 \cdot 7H_2O$) were used instead of manganese (II) sulfate monohydrate ($MnSO_4 \cdot H_2O$) and ferrous sulfate heptahydrate ($FeSO_4 \cdot 7H_2O$).

The prepared composite transition metal oxide was $Na_{2/3}Co_{0.5}Ni_{0.5}O_2$.

Example 4

A composite manganese oxide was prepared in the same manner as in Example 1 except that cobalt (II) sulfate heptahydrate ($CoSO_4 \cdot 7H_2O$) was used together with manganese (II) sulfate monohydrate ($MnSO_4 \cdot H_2O$) and ferrous sulfate heptahydrate ($FeSO_4 \cdot 7H_2O$).

The prepared composite transition metal oxide was $Na_{2/3}Fe_{0.45}Mn_{0.45}Co_{0.1}O_2$.

Example 5

A composite transition metal oxide was prepared in the same manner as in Example 1 except that nickel (II) sulfate hexahydrate ($NiSO_4 \cdot 6H_2O$) was used together with manganese (II) sulfate monohydrate ($MnSO_4 \cdot H_2O$) and ferrous sulfate heptahydrate ($FeSO_4 \cdot 7H_2O$).

The prepared composite transition metal oxide was $Na_{2/3}Fe_{0.45}Mn_{0.45}Ni_{0.1}O_2$.

Comparative Example 1

No Addition of Chelating Agent

A composite transition metal oxide was prepared in the same manner as in Example 1 except that ammonium hydroxide (NH4OH) as a chelating agent was not added.

The prepared composite transition metal oxide was $Na_{2/3}Fe_{0.5}Mn_{0.5}O_2$.

Figure 1C:
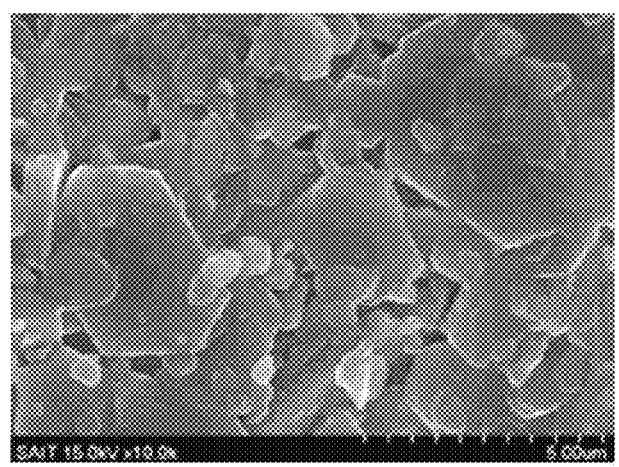
FIGS. 1C and 1D are SEM images of a cathode active material prepared according to Comparative Example 1.
Figure 1D:
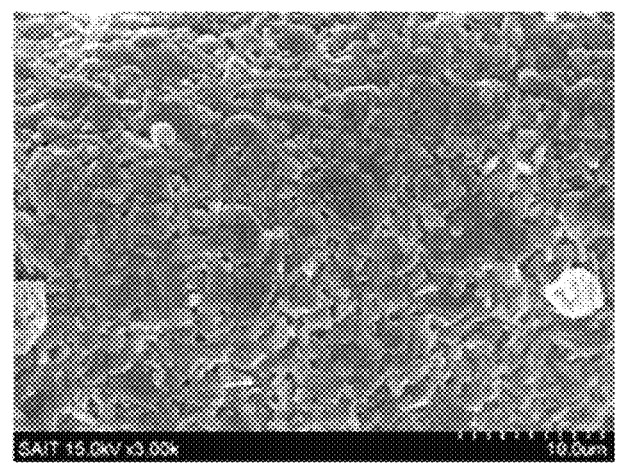

Scanning electron microscope (SEM) images of the prepared $Na_{2/3}Fe_{0.5}Mn_{0.5}O_2$ are illustrated in FIGS. 1C and 1D. Secondary particles of the prepared $Na_{2/3}Fe_{0.5}Mn_{0.5}O_2$ had an average diameter of about 5 μm, and secondary particles of the prepared $Na_{2/3}Fe_{0.5}Mn_{0.5}O_2$ had an average diameter of about 20 μm.

Comparative Example 2

Solid Phase Method

Sodium carbonate ($Na_2CO_3$), manganese oxide ($Mn_2O_3$) and ferric oxide ($Fe_2O_3$) as transition metal precursors were weighed to a mol ratio of 0.67:0.5:0.5, and the weighed sodium carbonate ($Na_2CO_3$), manganese oxide ($Mn_2O_3$) and ferric oxide ($Fe_2O_3$) were mixed for 10 minutes by using a dry type C-mixer to obtain a mixture. The mixture was filled in an alumina boat, heated in an air atmosphere by using an electric furnace, and the heated mixture was held at 900° C. for 10 hours to obtain a composite transition metal oxide.

The prepared composite transition metal oxide was $Na_{2/3}Fe_{0.5}Mn_{0.5}O_2$.

Comparative Example 3

Solid Phase Method+Carbon Coating

A carbon coating layer was added to the composite transition metal oxide that had been prepared according to Comparative Example 2.

The composite transition metal oxide was prepared in an amount of 1 g. Dimethyl naphthalene (DN) was put into 5 mL of methanol in the amount of 0.5 weight part (0.005 g), with respect to 100 weight parts (1 g) of the composite transition metal oxide that had been prepared according to Comparative Example 2, and dimethyl naphthalene was stirred in methanol at room temperature for 10 minutes so that dimethylnaphthalene was uniformly mixed with methanol to prepare a dimethyl naphthalene solution. Subsequently, the dimethyl naphthalene solution was dropped onto the composite transition metal oxide by a pipette so that dimethyl naphthalene was supported onto the composite transition metal oxide. The dimethyl naphthalene-supported composite transition metal oxide was dried in an oven of 120° C. for 2 hours to dry methanol from the dimethyl naphthalene-supported composite transition metal oxide, and then the dried dimethyl naphthalene-supported composite transition metal oxide was calcined at 550° C. for 3 hours to obtain a composite transition metal oxide having a carbon coating layer formed thereon.

Manufacturing of Sodium Half Cells

Example 6

The cathode active material prepared according to Example 1, Denka black as a conducting agent, and polyvinylidene fluoride (PVDF) as a binder were mixed in a weight ratio of 60:20:20 together with N-methylpyrrolidone (NMP) in an agate mortar to prepare a slurry. The slurry was bar-coated on an aluminum current collector to a thickness of 15 μm, the slurry-coated cathode plate was dried at room temperature, the slurry-coated cathode plate was dried again in vacuum at a temperature of 120° C., and the dried slurry-coated cathode plate was rolled and punched to prepare a cathode plate with a thickness of 55 μm. A 2032 type coin cell was prepared by using the cathode plate.

In the preparation of the cell, a sodium foil was used as a counter electrode, a glass fiber separator (Whatman GF/F CAT No. 1825-150) was used as a separator, and 1.0 M $NaPF_6$ dissolved in PC (polycarbonate) was used as an electrolyte solution.

Examples 7 to 10

Sodium secondary batteries were manufactured in the same manner as in Example 6 except that the cathode active materials prepared according to Examples 2 to 5 were respectively used.

Comparative Examples 4 to 6

Sodium secondary batteries were manufactured in the same manner as in Example 6 except that the cathode active materials prepared according to Comparative Examples 1 to 3 were respectively used.

Evaluation Example 1

XRD Evaluation

XRD analysis was conducted on the cathode active materials prepared according to Examples 1 to 5 and Comparative Examples 1 to 3. Some of the results are illustrated in FIG. 2.

Figure 2:
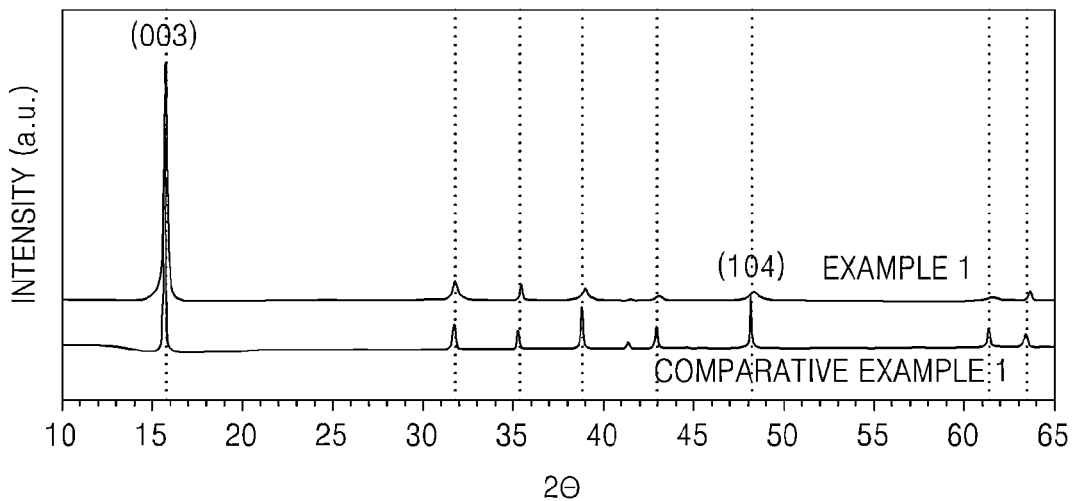
FIG. 2 is a graph of intensity (arbitrary units, a.u.) versus diffraction angle (degrees two-theta, 2θ) and is an X-ray powder diffraction (XRD) pattern of the cathode active materials prepared according to Example 1 and Comparative Example 1.

As illustrated in FIG. 2, a first diffraction peak in the cathode active material of Example 1 corresponding to a crystal face (003) derived from the layered rock salt structure occurred at a diffraction angle (2θ) 15.50°±0.50°, and a second diffraction peak in the cathode active material of Example 1 corresponding to a crystal face (104) derived from the cubic rock salt structure occurred at a diffraction angle (2θ) 48.50°±0.50°, and an intensity $I_1$ of the first diffraction peak and an intensity $I_2$ of the second diffraction peak had an intensity ratio ($I_1/I_2$) of about 24.

On the other hand, an intensity ratio ($I_1/I_2$) of an intensity $I_1$ of the first diffraction peak in the cathode active material of Comparative Example 1 to an intensity $I_2$ of the second diffraction peak in the cathode active material of Comparative Example 1 was about 4.5.

Evaluation Example 2

Electrical Resistance Analysis

Electric resistance values of the cathode active materials prepared according to Examples 1 to 5 and Comparative Examples 1 to 3 were measured by a 4-point probe method. A MCP-PD51 instrument manufactured by Mitsubishi Chemical Analytech was used for the electrical resistance measurement.

Figure 3:
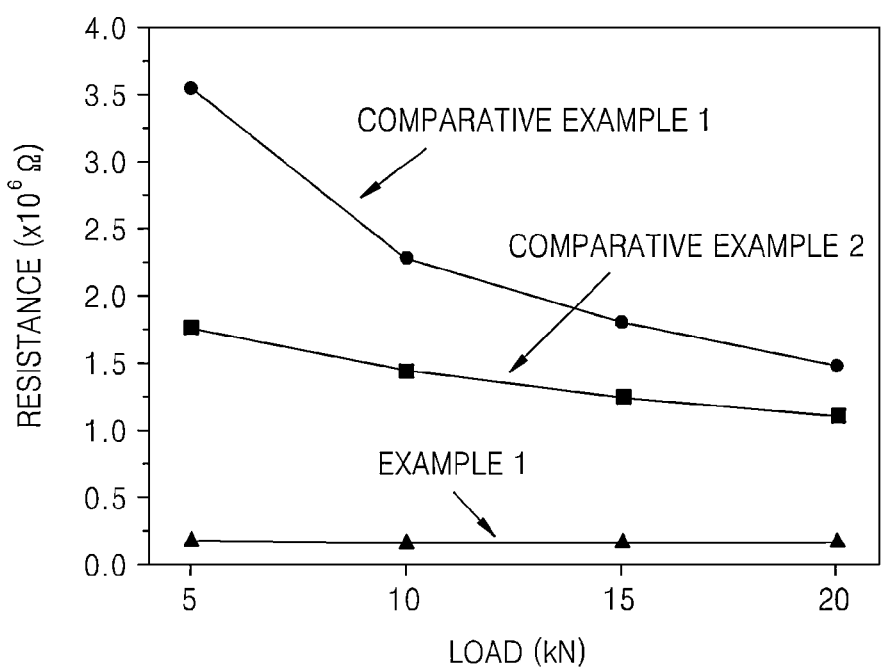
FIG. 3 is a graph of resistance (×$10^6$ ohms) versus load (kiloNeutons, kN) showing electrical resistance measurement results for cathode active materials prepared according to Example 1 and Comparative Examples 1 and 2.

Some of the results are illustrated in FIG. 3. As illustrated in FIG. 3, the composite transition metal oxide of Example 1 had a reduced electric resistance compared to the composite transition metal oxide of Comparative Examples 1 and 2. For instance, the composite transition metal oxide of Example 1 had an electric resistance value of $1.566 \times 10^5 \Omega$ at a load of 20 kN.

Evaluation 3

EDX Evaluation

Figure 4A:
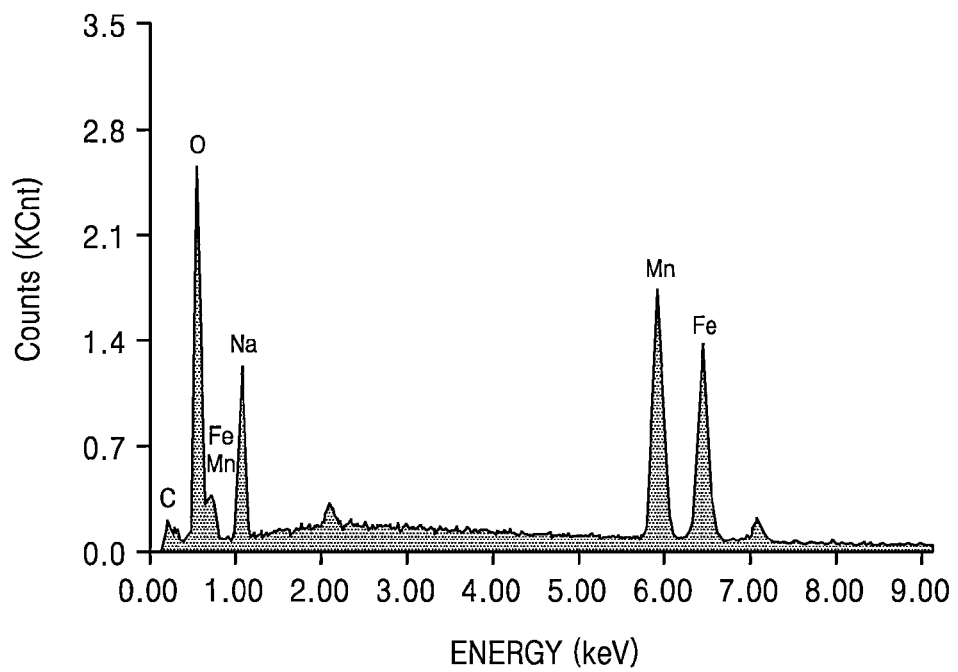
FIG. 4A is a graph of kilocounts versus energy (kiloelectron volts, keV) and is an energy dispersive x-ray spectroscopy (EDX) spectrum for the cathode active material prepared according to Example 1.
Figure 4B:
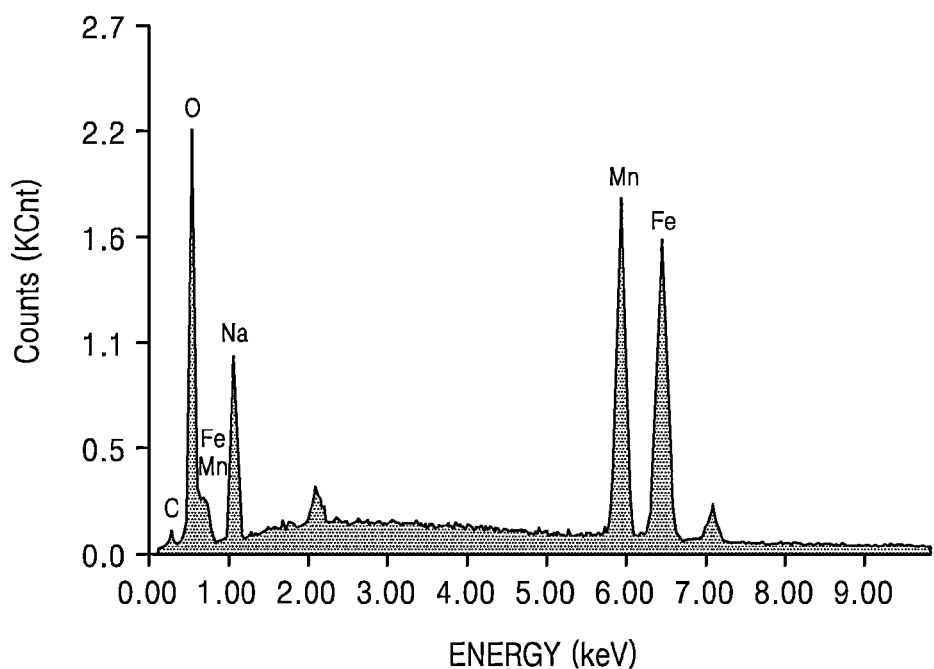
FIG. 4B is a graph of kilocounts versus energy (kiloelectron volts, keV) and is an EDX spectrum for the cathode active material prepared according to Comparative Example 1.

EDX tests were conducted with respect to the cathode active materials prepared according to Examples 1 to 5 and Comparative Examples 1 to 3, and some of the results are presented in Table 1 and FIGS. 4A and 4B.

TABLE 1

|  | Elements | Weight % | Atom % |
|---|---|---|---|
| Example 1 | CK | 02.70 | 08.16 |
|  | OK | 11.37 | 25.81 |
|  | NaK | 10.46 | 16.52 |
|  | MnK | 38.92 | 25.73 |
|  | FeK | 36.55 | 23.77 |
| Comparative Example 1 | CK | 01.26 | 04.18 |
|  | OK | 08.94 | 22.33 |
|  | NaK | 08.54 | 14.85 |
|  | MnK | 39.24 | 28.55 |
|  | FeK | 42.03 | 30.08 |

As shown in Table 1 and FIG. 4A, a content of carbon on the surface of the composite transition metal oxide of Example 1 was 8.16 atom %.

On the other hand, as shown in Table 1 and FIG. 4B, a content of carbon on the surface of the composite transition metal oxide of Comparative Example 1 was 4.18 atom %.

Therefore, the composite transition metal oxides of Example 1 had an increased carbon content on the surface thereof compared to that of the composite transition metal oxides of Comparative Example 1.

Evaluation Example 4

Nitrogen Adsorption Test

Nitrogen adsorption tests were conducted with respect to the composite transition metal oxides prepared according to Examples 1 to 5 and Comparative Examples 1 to 3. In the nitrogen adsorption tests, nitrogen was absorbed and desorbed onto composite transition metal oxide powders, and Brunauer-Emmett-Teller (BET) specific surface area values of the composite transition metal oxides were calculated through differences in amounts of nitrogen absorbed and desorbed onto the composite transition metal oxide powders. Some of the results are presented in Table 2.

TABLE 2

|  | Brunauer-Emmett-Teller (BET) specific surface area [m²/g] |
|---|---|
| Example 1 | 6.761 |
| Comparative Example 1 | 4.158 |

As shown in Table 2, the composite transition metal oxide of Example 1 exhibited a higher specific surface area than that of Comparative Example 1.

Evaluation Example 5

X-Ray Photoelectron Spectroscopy (XPS) Evaluation

The sodium secondary batteries manufactured according to Examples 6 to 10 and Comparative Examples 4 to 6 were subjected to one charging-discharging cycle and 30 charging-discharging cycles, at a constant current of 0.1 C rate and in a voltage range of about 2.0 V to about 4.2 V (vs. Na metal). Then, the sodium secondary batteries were disassembled, and X-ray photoelectron spectroscopy (XPS) analysis was conducted on the composite transition metal oxides thereof. Several test results are illustrated in FIGS. 5A to 5D.

Figure 5A:
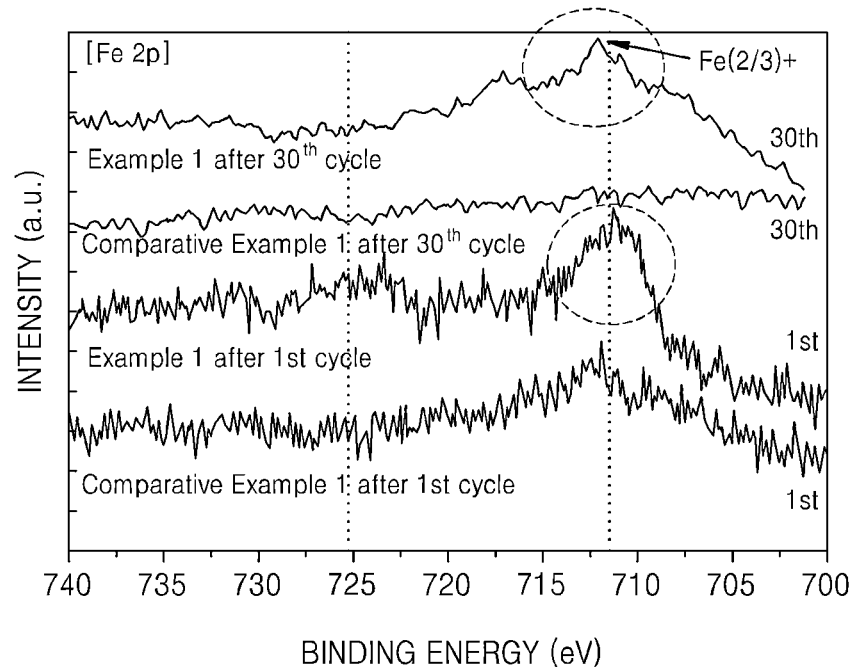
FIG. 5A is a graph of intensity (a.u.) versus binding energy (electron volts, eV) and shows X-ray photoelectron spectroscopy (XPS) spectra for the Fe 2p orbital of the cathode active material surface after performing one charging-discharging cycle and 30 charging-discharging cycles on sodium batteries of Example 6 and Comparative Example 4, which included the cathode active materials prepared according to Example 1 and Comparative Example 1, respectively.

As illustrated in FIG. 5A, after performing one (i.e., a first) charging-discharging cycle and 30 charging-discharging cycles respectively, Fe peaks were detected in the composite manganese oxide of Example 1. Thus, a thickness of a solid electrolyte interface (SEI) layer formed on the surface of the composite manganese oxide of Example 1 was 5 nm or less within an XPS detection range.

Meanwhile, although a Fe peak in the composite transition metal oxide of Comparative Example 1 was detected after performing one (a first) charging-discharging cycle, a Fe peak was not detected after performing 30 charging-discharging cycles. Thus, a thickness of a solid electrolyte layer formed on the surface of the composite transition metal oxide of Comparative Example 1 was in a range of from about more than 5 nm to about 20 nm, which exceeded the XPS detection range.

Figure 5B:
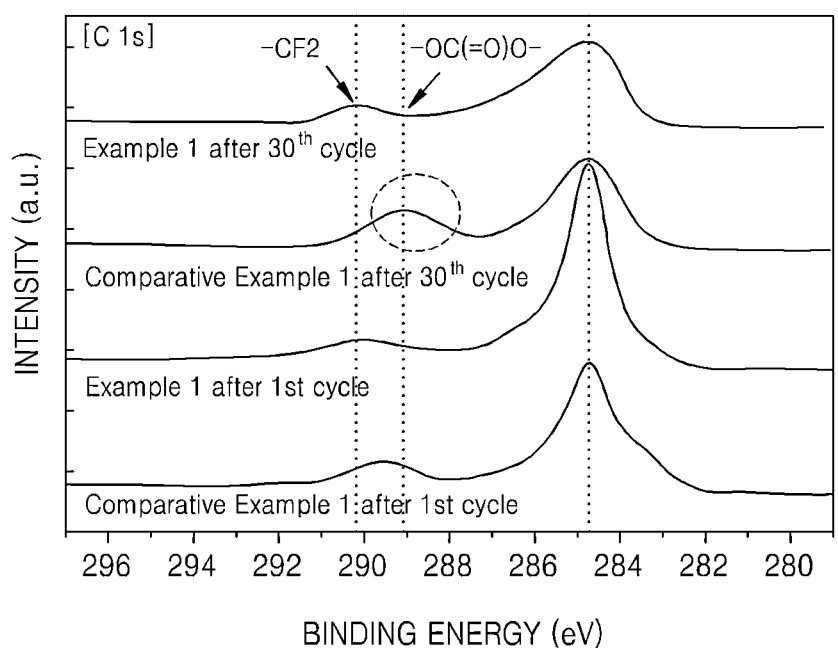
FIG. 5B is a graph of intensity (a.u.) versus binding energy (electron volts, eV) and shows XPS spectra for the C 1s orbital of the cathode active material surface after performing one charging-discharging cycle and 30 charging-discharging cycles on the sodium batteries of Example 6 and Comparative Example 4, which included the cathode active materials prepared according to Example 1 and Comparative Example 1, respectively.

Further, in the composite transition metal oxide of Example 1 as illustrated in FIG. 5B, peaks corresponding to —$CF_2$ were observed, and peaks for a carbonate group (—OC(=O)O—), which is understood to have a high resistance value, was insignificant after respectively performing one (a first) charging-discharging cycle and 30 charging-discharging cycles. Also, in the composite manganese oxide of Comparative Example 1, a peak for the carbonate group (—OC(=O)O—), which is understood to have a high resistance value, was greatly increased after performing 30 charging-discharging cycles.

Figure 5C:
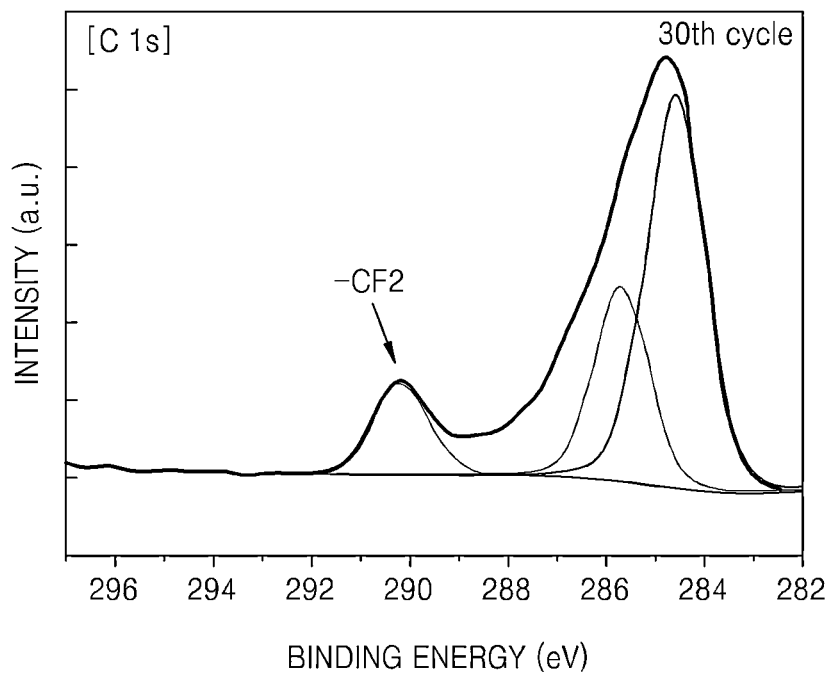
FIG. 5C is a graph of intensity (a.u.) versus binding energy (electron volts, eV) and shows an XPS spectrum for the C 1s orbital of the cathode active material surface after performing charging-discharging on the sodium battery of Example 6, which included the cathode active material prepared according to Example 1.

For instance, in an XPS spectrum of the composite transition metal oxide of Example 1, after performing 30 cycles as illustrated in FIG. 5C, an intensity $P_{CF2}$ of a peak corresponding to —$CF_2$ represented in the vicinity of 290 eV and an intensity $P_{CO3}$ of a peak corresponding to —OC(=O)O— represented in the vicinity of 289 eV had an intensity ratio $P_{CO3}/P_{CF2}$ of 0.1 or less.

Figure 5D:
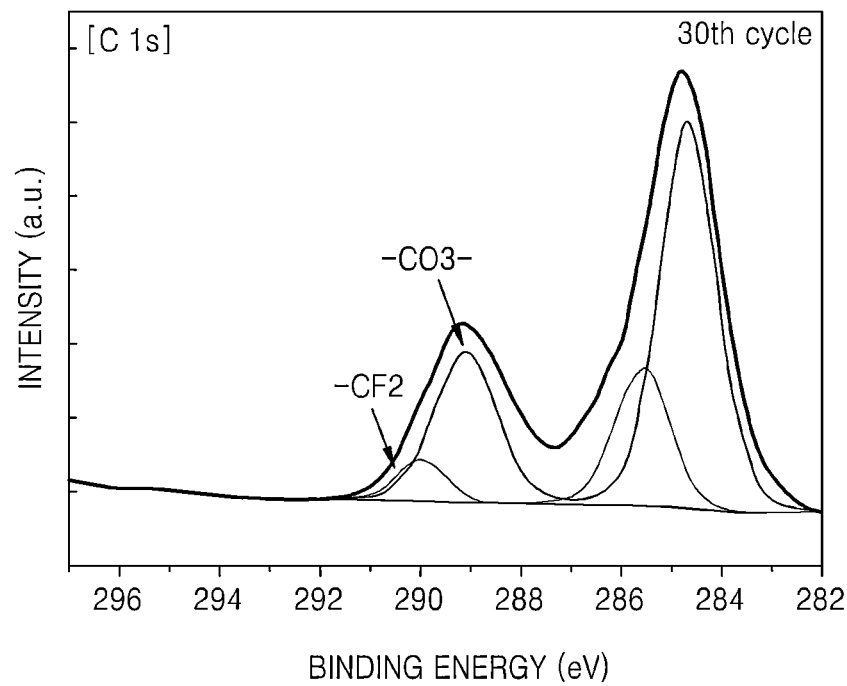
FIG. 5D is a graph of intensity (a.u.) versus binding energy (electron volts, eV) and shows an XPS spectrum for the C 1s orbital of the cathode active material surface after performing charging-discharging on the sodium battery of Comparative Example 4, which included the cathode active material prepared according to Comparative Example 1.

For instance, in an XPS spectrum of the composite transition metal oxide of Comparative Example 1, after performing 30 cycles as illustrated in FIG. 5D, an intensity ratio $P_{CO3}/P_{CF2}$ of an intensity $P_{CF2}$ of a peak corresponding to —$CF_2$ represented in the vicinity of 290 eV to an intensity $P_{CO3}$ of a peak corresponding to —OC(=O)O-represented in the vicinity of 289 eV was more than about 2.

Evaluation Example 6

Impedance Evaluation

Figure 6A:
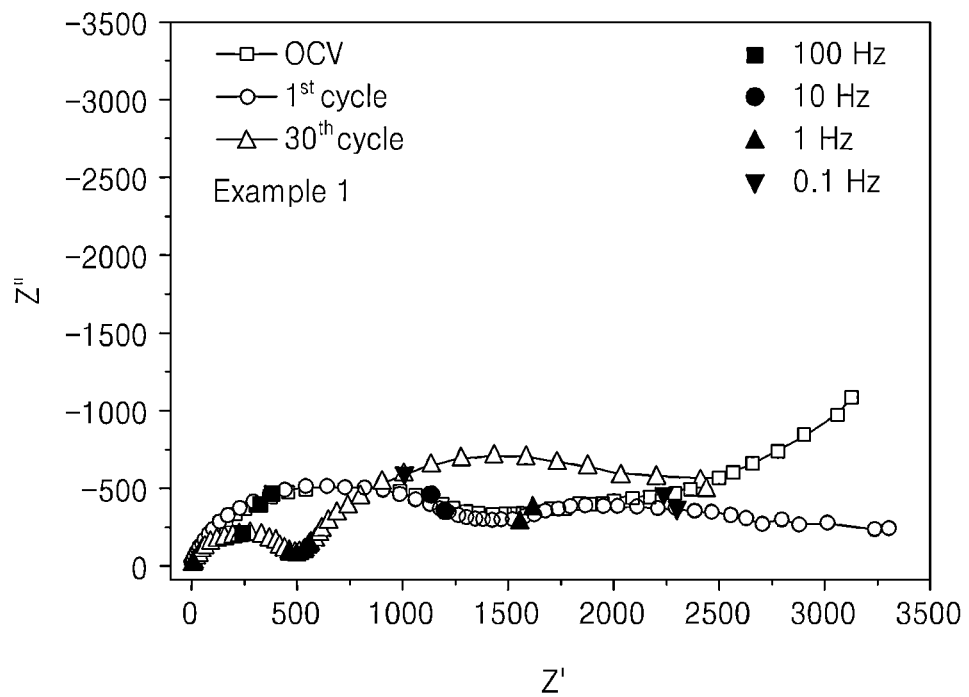
FIG. 6A is a graph of real impedance (Z') versus imaginary impedance (Z") and is a Nyquist plot of impedance measurement results after performing charging-discharging on the sodium battery of Example 6, which included the cathode active material prepared according to Example 1.
Figure 6B:
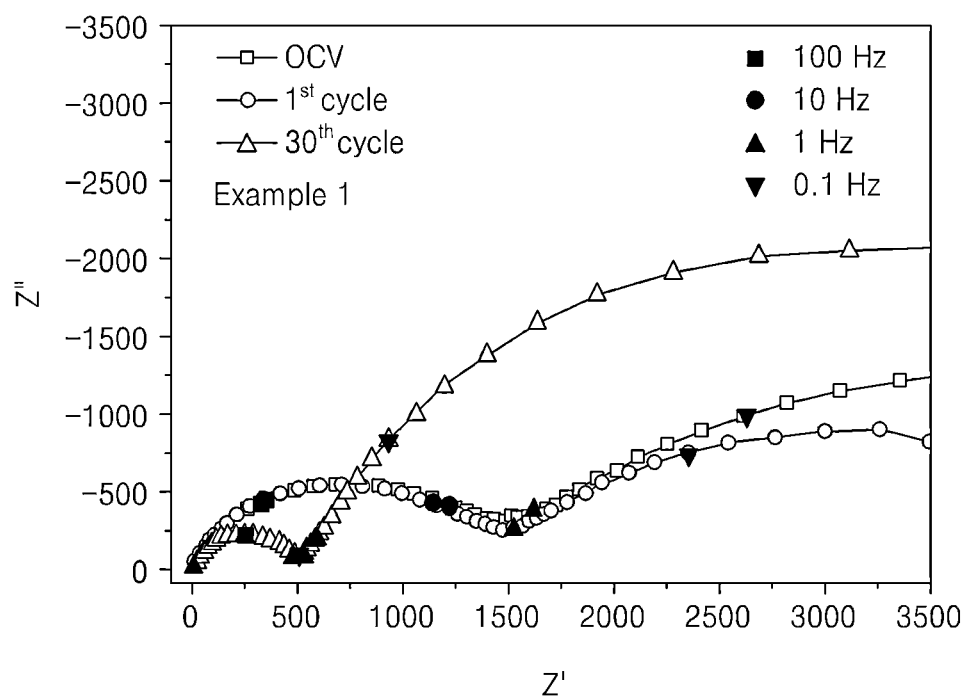
FIG. 6B is a graph of real impedance (Z') versus imaginary impedance (Z") and is a Nyquist plot illustrating impedance measurement results after performing charging-discharging on the sodium battery of Comparative Example 4 including the cathode active material prepared according to Comparative Example 1.

After the sodium secondary batteries manufactured according to Examples 6 to 10 and Comparative Examples 4 to 6 were subjected to one charging-discharging cycle and 30 charging-discharging cycles at a constant current of 0.1 C rate an in a voltage range of about 2.0 V to about 4.2 V with respect to sodium metal, impedance was measured by a 2-probe method using Material Mates 7260 impedance analyzer. The frequency range was from about 0.1 Hertz (Hz) to about 10 megaHertz (MHz). Nyquist plots with respect to some of the impedance measurement results are illustrated in FIGS. 6A and 6B. FIG. 6A relates to the composite transition metal oxide of Example 1 included in the sodium secondary battery of Example 6, and FIG. 6B relates to the composite transition metal oxide of Comparative Example 1 included in the sodium secondary battery of Comparative Example 4.

As illustrated in FIGS. 6A and 6B, both the composite cathode active material of Example 1 and the composite cathode active material of Comparative Example 1, after performing 30 charging-discharging cycles, showed similar resistance (Rct) values of about 500 $\Omega cm^2$ caused by the charge transfer reaction.

However, the composite cathode active material of Example 1 after performing 30 charging-discharging cycles had a substantially reduced resistance (Rf) which is understood to be caused by the SEI compared to that of the composite cathode active material of Comparative Example 1. For instance, although the composite cathode active material of Example 1, after performing 30 charging-discharging cycles, showed a resistance (Rf) of about 2500 $\Omega cm^2$, which is understood to be caused by the SEI, the composite cathode active material of Comparative Example 1 showed a remarkably increased resistance (Rf) value caused by the SEI.

Evaluation Example 7

Evaluation of the Lifetime Characteristics

The sodium secondary batteries manufactured according to Examples 6 to 10 and Comparative Examples 4 to 6 were subjected to 100 charging-discharging cycles with a constant current of 0.1 C rate at 25° C. and in a voltage range of about 2.0 V to about 4.2 V with respect to sodium metal, and some of the charging-discharging results are presented in the following Table 3. Initial Coulombic efficiencies and capacity retention rates are determined according to Formulas 1 and 2 below.

Initial coulombic efficiency [%]=[$1^{st}$ cycle discharge capacity/$1^{st}$ cycle charge capacity]×100  Mathematical Formula 1

Capacity retention rate [%]=[$30^{th}$ cycle discharge capacity/$1^{st}$ cycle discharge capacity]×100  Mathematical Formula 2

TABLE 3

| | Initial Coulombic Efficiency (first cycle) [%] | Capacity Retention Rate [%] |
|---|---|---|
| Example 6 | 70 | 94.3 |
| Example 7 | 81 | 78.4 |
| Comparative Example 4 | 50 | 78 |
| Comparative Example 5 | 55 | 78.9 |
| Comparative Example 6 | 58 | 74.7 |

As shown in Table 3, the sodium secondary batteries of Examples 6 and 7 had improved initial Coulombic efficiencies and lifetime characteristics compared to the sodium secondary batteries of Comparative Examples 4 to 6.

Evaluation Example 8

Evaluation of the High-Rate Characteristics

Figure 7:
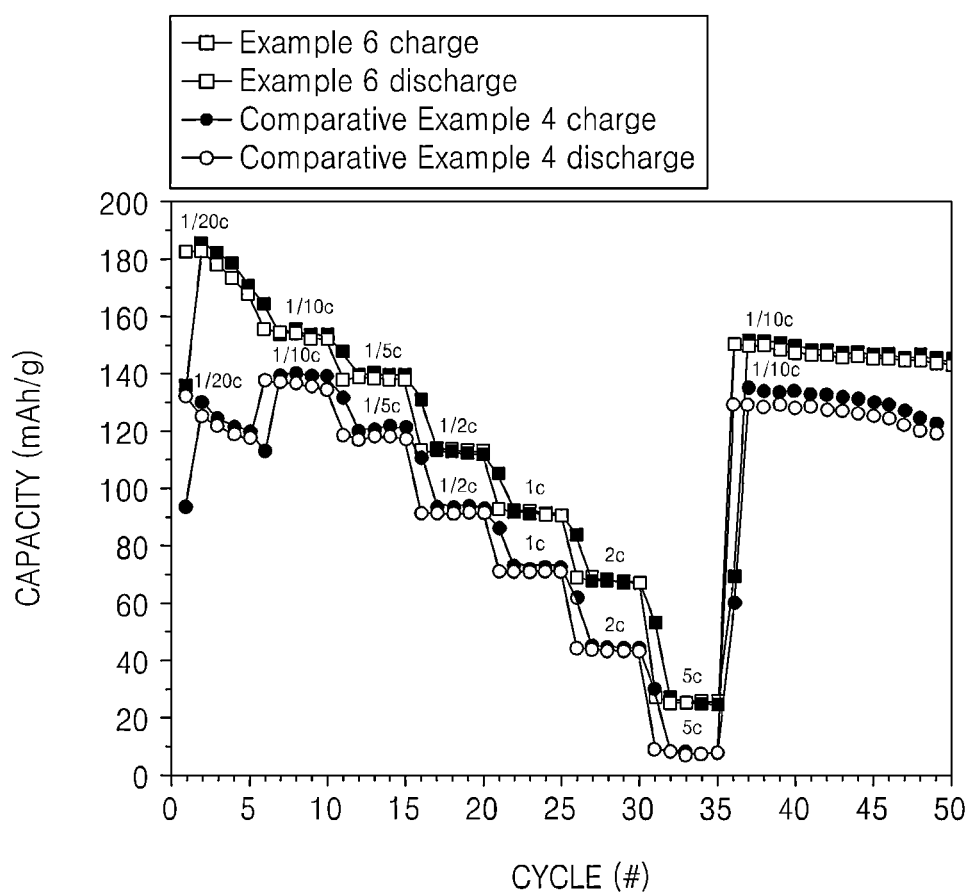
FIG. 7 is a graph of capacity (milliampere-hours per gram, mAh/g) versus cycle number showing high-rate characteristics of sodium batteries prepared according to Example 7 and Comparative Example 4.

Discharge capacity values according to an increase in the current density were measured while charging the sodium secondary batteries manufactured according to Examples 6 to 10 and Comparative Examples 4 to 6 with a constant current of 0.1 C rate at 25° C. and in a voltage range of about 2.0 V to about 4.2 V with respect to sodium foil. Some of the results are illustrated in FIG. 7. Shown in FIG. 7 is the discharge capacity when the sodium secondary batteries were discharged at 0.05, 0.1, 0.2, 0.5, 1, 2, and 5 C rates.

As illustrated in FIG. 7, the sodium secondary battery of Example 6 had improved high-rate characteristics due to a high discharge capacity even at the higher rate compared to the sodium secondary battery of Comparative Example 4.

As described above, according to one or more of the above embodiments, initial discharge capacity, high-rate characteristics and lifetime characteristics of the sodium secondary battery may be improved by using the cathode active material with improved electrical conductivity and structural stability.

It should be understood that the exemplary embodiments described therein should be considered in a descriptive sense only and not for purposes of limitation. Descriptions of features, advantages, or aspects within each embodiment should typically be considered as available for other similar features, advantages or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A cathode active material comprising a composite transition metal oxide comprising:
   sodium;
   a first transition metal; and
   a second transition metal,
   wherein the composite transition metal oxide has
      a first diffraction peak corresponding to a Miller index of (003) and derived from a layered rock salt structure, and
      a second diffraction peak corresponding to a Miller index of (104) and derived from a cubic rock salt structure in an X-ray powder diffraction pattern of the composite transition metal oxide,
   wherein an intensity ratio ($I_1/I_2$) of the first diffraction peak to the second diffraction peak is about 10 or greater,
   wherein the composite transition metal oxide is represented by Formula 2:

$$Na_xM_zMb_yO_{2+d}$$ Formula 2 wherein
   Ma is the first transition metal and is one or more elements selected from iron (Fe), ruthenium (Ru), osmium (Os), chromium (Cr), molybdenum (Mo), and tungsten (W),
   Mb is the second transition metal and is one or more elements selected from Groups 4, 5, 7, and 9 of Periodic Table of the Elements, and
   $0.5 \leq x < 1$, $0.3 \leq z \leq 0.5$, $0.5 \leq v \leq 0.7$, $z+v=1$, and $-0.3 \leq d < 1$.

2. The cathode active material of claim 1, wherein the first diffraction peak occurs at a diffraction angle (2θ) of 15.50°±0.50°, and the second diffraction peak occurs at a diffraction angle (2θ) of 48.50°±0.50°.

3. The cathode active material of claim 1, wherein the composite transition metal oxide is represented by Formula 3 below:

$$Na_xMa_zMb_yO_{2+d}$$ Formula 3 wherein Ma is the first transition metal and is Fe or Cr,
   Mb is the second transition metal and is one or more elements selected from manganese (Mn), cobalt (Co), vanadium (V), and titanium (Ti), and
   $0.5 \leq x < 1$, $0.3 \leq z \leq 0.5$, $0.5 \leq v \leq 0.7$, $z+v=1$, and $-0.3 \leq d < 1$.

4. The cathode active material of claim 1, wherein the composite transition metal oxide is represented by Formula 4 below:

$$Na_xFe_zMb_yO_2$$ Formula 4 wherein Mb is the second transition metal and is Mn, and $0.5 \leq x < 1$, $0.3 \leq z \leq 0.5$, $z+v=1$, and $0.5 \leq v \leq 0.7$.

5. The cathode active material of claim 1, wherein the composite transition metal oxide further comprises carbon on a surface thereof.

6. The cathode active material of claim 1, wherein the composite transition metal oxide has a surface carbon content of 5 atomic percent or greater, when determined by energy dispersive X-ray spectroscopy.

7. The cathode active material of claim 1, wherein the composite transition metal oxide comprises primary particles having an average particle diameter of about 1 micrometer or more.

8. The cathode active material of claim 1, wherein the composite transition metal oxide has a Brunauer-Emmett-Teller specific surface area of about 5 square meters per gram or more.

9. The cathode active material of claim 1, wherein the composite transition metal oxide has an electrical resistance of about $1 \times 10^6$ ohms or less at a load of 20 kiloNeutons or more.

10. The cathode active material of claim 1, wherein the composite transition metal oxide further comprises a solid electrolyte interface on a surface thereof, the solid electrolyte interface having a thickness of about 5 nanometers or less, wherein the thickness of the solid electrolyte interface is determined after a sodium secondary battery comprising the composite transition metal oxide undergoes 30 cycles of charge and discharge at a constant current of 0.1 C rate in a voltage range of about 2.0 volts to about 4.2 volts versus Na metal.

11. The cathode active material of claim 10, wherein the surface of the composite transition metal oxide has a $P_{CO3}/P_{CF2}$ intensity ratio of about 0.1 or less, wherein $P_{CF2}$ denotes a peak intensity corresponding to —$CF_2$ at about 290 electron volts and $P_{CO3}$ denotes a peak intensity corresponding to —OC(=O)O— at about 289 electron volts in an X-ray photoelectron spectroscopy spectrum.

12. The cathode active material of claim 10, wherein a resistance of the SEI on the surface of the composite transition metal oxide, when determined by impedance spectroscopy, is about 5000 ohms-square centimeters or less.

13. The cathode active material of claim 1, wherein when the composite transition metal oxide is charged and discharged, cation mixing, in which transition metal ions from a portion having the cubic rock salt structure are inserted into a transfer path of sodium ions of a portion having the layered structure, does not occur.

14. A cathode comprising the cathode active material of claim 1.

15. A sodium secondary battery comprising:
   the cathode of claim 14;
   an anode; and
   an electrolytic solution comprising sodium ions.

* * * * *